(12) United States Patent
Balbás et al.

(10) Patent No.: US 12,554,069 B2
(45) Date of Patent: Feb. 17, 2026

(54) MULTI-DIRECTIONAL ADAPTIVE OPTICAL DEVICE

(71) Applicant: Ommatidia LIDAR S.L., Madrid (ES)

(72) Inventors: Eduardo Margallo Balbás, Madrid (ES); José Luis Rubio Guivernau, Madrid (ES)

(73) Assignee: OMMATIDIA LIDAR S.L., Madrid (ES)

( * ) Notice: Subject to any disclaimer, the term of this patent is extended or adjusted under 35 U.S.C. 154(b) by 373 days.

(21) Appl. No.: 18/016,788

(22) PCT Filed: Jul. 19, 2021

(86) PCT No.: PCT/EP2021/070081
§ 371 (c)(1),
(2) Date: Jan. 18, 2023

(87) PCT Pub. No.: WO2022/018004
PCT Pub. Date: Jan. 27, 2022

(65) Prior Publication Data
US 2023/0288638 A1    Sep. 14, 2023

Related U.S. Application Data

(60) Provisional application No. 63/053,854, filed on Jul. 20, 2020.

(51) Int. Cl.
*G02B 6/12* (2006.01)
*G02B 6/125* (2006.01)
(Continued)

(52) U.S. Cl.
CPC ......... *G02B 6/262* (2013.01); *G02B 6/12004* (2013.01); *G02B 6/125* (2013.01);
(Continued)

(58) Field of Classification Search
CPC .... G02B 6/12004; G02B 6/125; G02B 6/262; G02B 6/2804; G02B 6/29317; G02B 6/30;
(Continued)

(56) References Cited

U.S. PATENT DOCUMENTS 5,677,697 A * 10/1997 Lee .................. G01S 7/282
  342/368
7,119,733 B2 * 10/2006 Schoeberl ........... G01S 7/032
  342/373

(Continued)

FOREIGN PATENT DOCUMENTS

JP     H1013145 A     1/1998
JP     2017-051903 A2   3/2017
(Continued)

OTHER PUBLICATIONS

International Search Report and Written Opinion received for PCT/EP2021/070081, dated Oct. 26, 2021. 11 pages.
(Continued)

*Primary Examiner* — Ryan A Lepisto
(74) *Attorney, Agent, or Firm* — Arcane Law PLLC

(57) ABSTRACT

Multi-directional optical devices are disclosed. The optical device may employ a multiple input/multiple output optical coupling structure to determine propagation direction of received light (in receiver configuration), and/or control the propagation direction of transmitted light (in transmitter configuration). Propagation direction can be determined without the need for moving parts. In accordance with some embodiments, designs of solid-state photonic integrated circuits (PICs) are disclosed herein that utilize N×M star couplers to perform Fourier transformations to light traversing between the N ports and M ports such that light arriving at one or more of the N ports is distributed with a linear phase profile across the M ports. The slope of the linear (Continued)

phase profile is dependent on which of the N ports that light was received from. The light exits from waveguides coupled to the M ports at one or more propagation directions dependent on the linear phase profile.

19 Claims, 18 Drawing Sheets

(51) Int. Cl.
| | |
|---|---|
| G02B 6/26 | (2006.01) |
| G02B 6/28 | (2006.01) |
| G02B 6/293 | (2006.01) |
| G02B 6/30 | (2006.01) |
| G02B 6/32 | (2006.01) |
| G02B 6/35 | (2006.01) |
| G02B 6/42 | (2006.01) |
| G02F 1/01 | (2006.01) |
| G02F 1/313 | (2006.01) |

(52) U.S. Cl.
CPC ....... *G02B 6/2804* (2013.01); *G02B 6/29317* (2013.01); *G02B 6/30* (2013.01); *G02B 6/32* (2013.01); *G02B 6/3542* (2013.01); *G02B 6/3546* (2013.01); *G02B 6/4246* (2013.01); *G02F 1/0115* (2013.01); *G02F 1/3132* (2013.01); *G02B 2006/12147* (2013.01)

(58) Field of Classification Search
CPC ...... G02B 6/32; G02B 6/3542; G02B 6/3546; G02B 6/4246; G02B 2006/12147; G02F 1/0115; G02F 1/3132
See application file for complete search history.

(56) References Cited

U.S. PATENT DOCUMENTS

| | | | | |
|---|---|---|---|---|
| 7,415,244 | B2* | 8/2008 | Kolinko | G01V 8/005 |
| | | | | 343/915 |
| 7,751,658 | B2* | 7/2010 | Welch | H01S 5/0265 |
| | | | | 385/24 |
| 8,976,061 | B2* | 3/2015 | Chowdhury | G01S 13/584 |
| | | | | 343/700 R |
| 9,128,241 | B2 | 9/2015 | Baets et al. | |
| 9,354,040 | B2 | 5/2016 | Rubio Guivernau et al. | |
| 10,261,389 | B2* | 4/2019 | Skirlo | G02F 1/3136 |
| 10,649,306 | B2* | 5/2020 | Skirlo | G02F 1/3136 |
| 10,686,523 | B1* | 6/2020 | Gleason | H01Q 21/065 |
| 11,125,878 | B2* | 9/2021 | Schmalenberg | G01S 7/4915 |
| 11,163,116 | B2* | 11/2021 | Lopez | G02B 6/12004 |
| 11,448,823 | B1* | 9/2022 | Doerr | G01S 17/10 |
| 11,480,818 | B2* | 10/2022 | Inada | G02B 6/3546 |
| 2003/0002788 | A1* | 1/2003 | Bhagavatula | G02B 6/12021 |
| | | | | 385/27 |
| 2017/0371227 | A1 | 12/2017 | Skirlo et al. | |
| 2019/0170875 | A1 | 6/2019 | Schmalenberg et al. | |
| 2019/0391243 | A1* | 12/2019 | Nicolaescu | G01S 17/42 |
| 2022/0155419 | A1* | 5/2022 | Yu | G01S 7/4817 |
| 2022/0334255 | A1* | 10/2022 | Shin | G01S 17/06 |

FOREIGN PATENT DOCUMENTS

| | | |
|---|---|---|
| JP | 2017-511903 A2 | 4/2017 |
| WO | WO2021130149 A1 | 7/2021 |
| WO | WO2021139149 A1 | 7/2021 |
| WO | 2022018004 A1 | 1/2022 |

OTHER PUBLICATIONS

International Preliminary Report on Patentability received for PCT/EP2021/070081, dated Oct. 18, 2022. 10 pages.

Dragone, C., "An N×N Optical Multiplexer Using a Planar Arrangement of Two Star Couplers," IEEE Photonics Technology Letters, vol. 3, No. 9, Sep. 1991. pp. 812-814.

Guan, et al., "Free-space coherent optical communication with orbital angular, momentum multiplexing/demultiplexing using a hybrid 3D photonic integrated circuit," Optics Express, published Dec. 23, 2013-Jan. 13, 2014, vol. 22., No. 1. 12 pages.

Smit, et al., "PHASAR-Based WDM-Devices: Principles, Design and Applications," IEEE Journal of Selected Topics in Quantum Electronics, vol. 2, No. 2, Jun. 1996. pp. 236-250.

Written Opinion of the International Preliminary Examining Authority for PCT/EP2021/070081, dated Jun. 13, 2022. 8 pages.

JP Office Action issued Sep. 2, 2025 in JP Application No. 2023-504027. Office action and machine translation 5 pages.

* cited by examiner

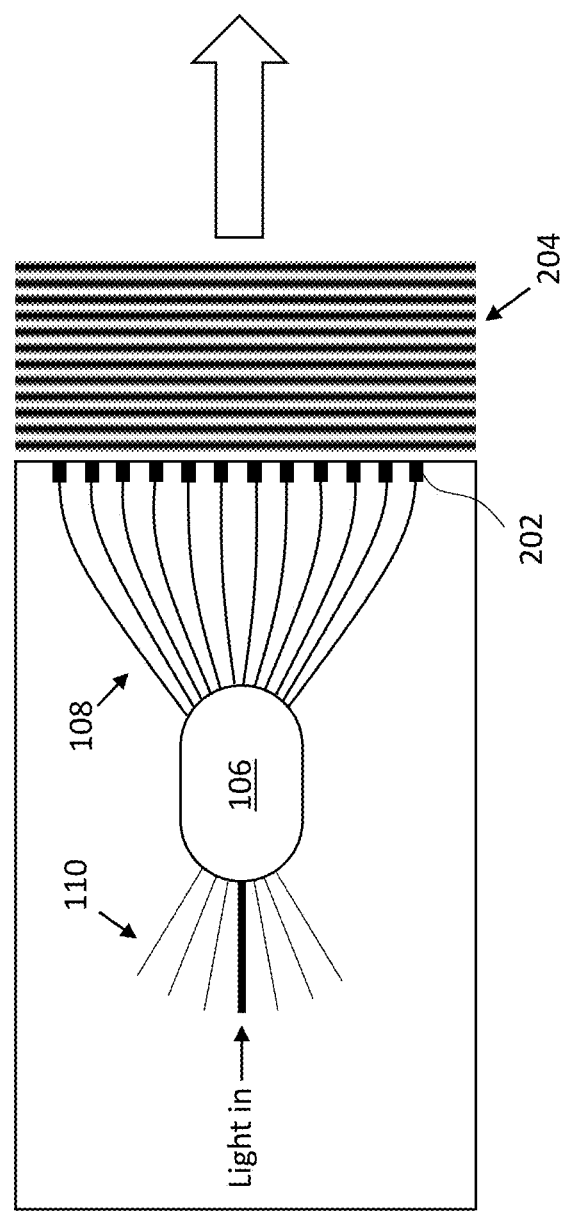

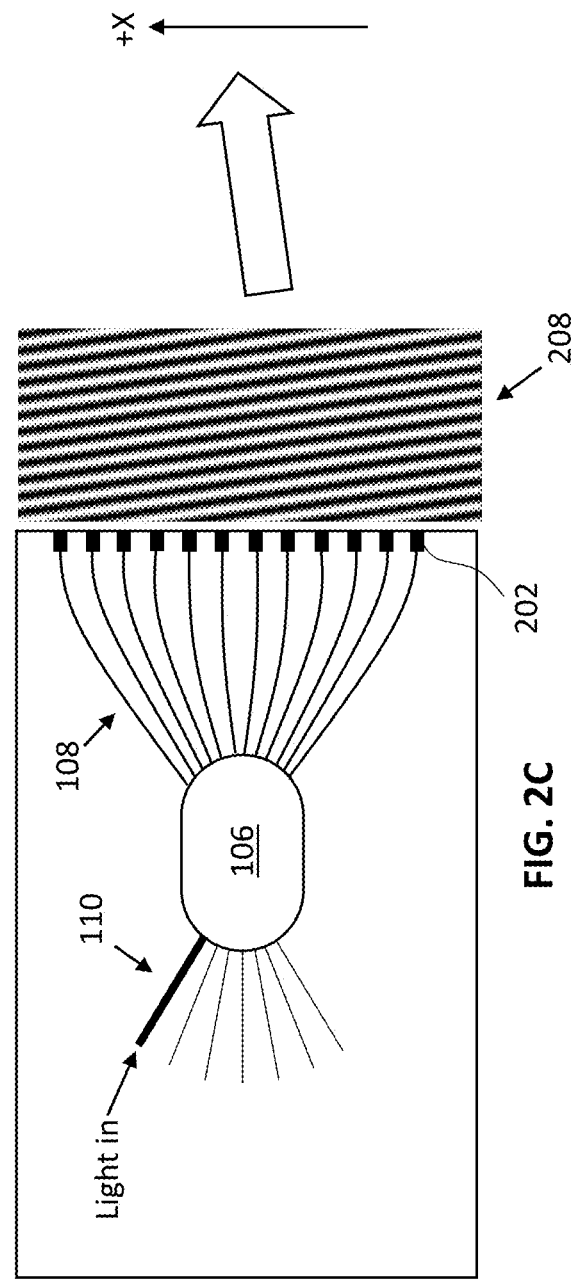

MULTI-DIRECTIONAL ADAPTIVE OPTICAL DEVICE

BACKGROUND

Photonic integrated circuits (PICs) are used in many fields that transmit or receive data modulated onto or otherwise included in an optical signal. The optical signals are typically in the infrared or visible spectrum. Applications such as fiber-optic communications, biomedical, and photonic computing can all utilize PICs to integrate various photonic functions on transmitted or received light. Such applications can benefit from multi-directional point-to-point optical communication capability. A number of non-trivial issues remain with respect to providing multi-directional optical communication.

BRIEF DESCRIPTION OF THE DRAWINGS

FIGS. 2A-2C are schematic diagrams that demonstrate example operations of an optical element of a photonic integrated circuit, the optical element including a coupling region, a first plurality of waveguides, and a second plurality of waveguides, in accordance with some embodiments of the present disclosure.

Figure 1:
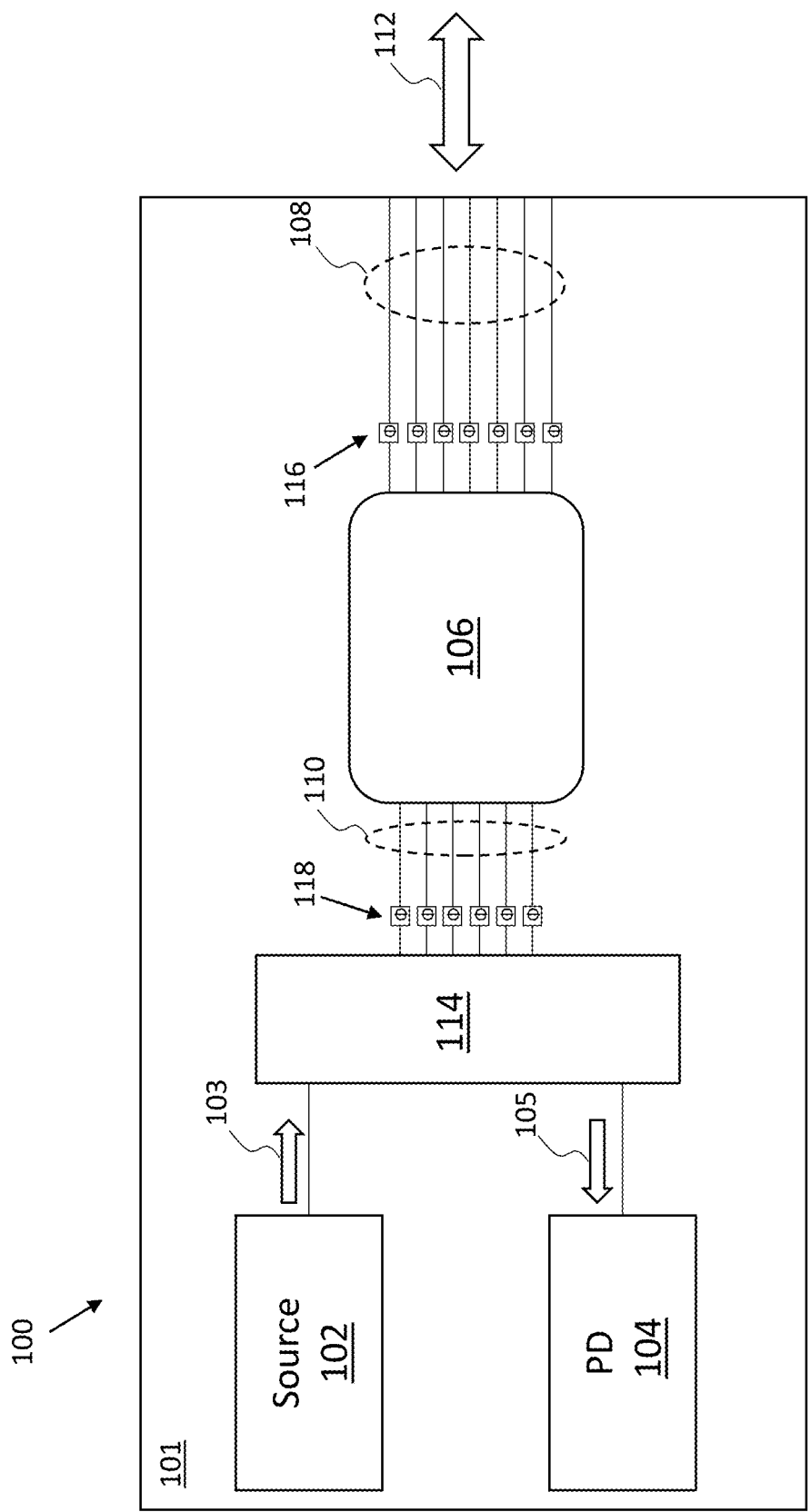
FIG. 1 is a schematic diagram of a photonic integrated circuit having a source and a photodetector, in accordance with an embodiment of the present disclosure.

These and other features of the present embodiments will be understood better by reading the following detailed description, taken together with the figures herein described.

DETAILED DESCRIPTION

Optical device structures are disclosed. The superposition principle applies, such that the structures allow for multi-directional communication. In an embodiment, the optical device employs a multiple input/multiple output (MIMO) optical coupling structure to determine propagation direction of received light (in receiver configuration), and/or control the propagation direction of transmitted light (in transmitter configuration). In either case, note that the propagation direction is determined in an akinetic fashion, without the need for moving parts. In accordance with some such embodiments, a solid-state photonic integrated circuit (PIC) employs an N×M star coupler to perform Fourier transformations to light traversing between the N ports and M ports such that light arriving at one or more of the N ports is distributed with a linear phase profile across the M ports. The slope of the linear phase profile is dependent on which of the N ports that light was received from. The light exits from waveguides coupled to the M ports at a propagation direction dependent on the linear phase profile. The reciprocal is also true such that light received at the M ports from a given propagation direction will exhibit a corresponding phase profile across the M ports. The received light from the M ports will be coupled into one or more of the N ports based on the phase profile of the received light. In this way, PICs can be designed to act as optical transmitters that can control transmission direction of produced light and/or optical receivers that can determine propagation direction of received light. Numerous embodiments and variations of such embodiments will be appreciated in light of this disclosure.

General Overview

As previously noted, there are a number of non-trivial issues that remain with respect to providing multi-directional optical communication. In more detail, being able to distinguish and/or control propagation direction of light is useful for numerous optical applications such as simultaneous point-to-point optical communication systems, channel-adaptive optical communication systems, and for performing multi-directional optical sensing. Unfortunately, existing devices designed for such applications use moving elements, such as adjustable micromirrors, to change the propagation direction of emitted light. Having to move elements that are part of the optical circuit, or having to move the optical device itself, requires additional complexity and power, and further gives rise to wear of the moving pieces over time and causes thermal management issues with respect to heat generation.

Thus, techniques are disclosed for designing and using a multi-directional adaptive optical device that can determine propagation direction of received light and/or change the propagation direction of transmitted light without the use of moving elements. The term "light" as used herein may refer to any portion of the electromagnetic (EM) spectrum. In some embodiments, light refers to the visible portion of the EM spectrum or the infrared portion of the EM spectrum. For example, light may refer to infrared radiation having wavelengths anywhere between 1.3 µm and 1.7 µm. According to some embodiments, a multi-directional adaptive optical device uses one or more N×M star couplers, each coupler having N ports on one side of a coupling region and M ports on another side of the coupling region. In operation, light arriving at one or more of the N ports of the star coupler is distributed across the M ports of the star coupler with a linear phase profile dependent on which of the N ports the light was received from. By changing the phase profile, the light exits from the ends of waveguides coupled to the M ports with a different phase front. The propagation direction of the exiting light is dependent on the phase front of the light. Given the reciprocity principle, the reciprocal is also true in the opposite communication direction, such that light with a given phase front is received by the M ports of the star coupler and directed to one or more of the N ports based on the phase front of the light. In this way, propagation direction of the received light can be determined based on which of the N ports includes the routed light. Light may be transmitted at multiple directions simultaneously from a set of waveguides and light may be received from multiple different directions simultaneously from the same set of waveguides.

Numerous PIC or other optical device designs can be realized using one or more of the star couplers described herein. As will be further explained in turn, optical multiplexers, phase modulators, and amplitude modulators may be included to control and/or better distinguish the light. In some embodiments, multiple PICs can be used in an optical system to communicate with one another using free-space optical signals, where the determined optical signal direction can be used to determine which PIC the signal originated from. Furthermore, the direction of the transmitted optical signal from a given PIC may be controlled to select which downstream PIC receives the optical signal. In some embodiments, optical reception or transmission can occur across a two-dimensional region on a substrate by using multiple linked star couplers. Light may also be collected from various propagation directions with minimal loss and without the need to move pathway surfaces or rotate the PIC, which may have great benefits for many applications, such as telescope-based applications or any other applications that gather light from a relatively large area.

Numerous optical device structures will be apparent. For instance, and in accordance with an example embodiment, an integrated photonic system includes a substrate and an optical element on the substrate. The optical element includes a coupling region, a first plurality of waveguides, and a second plurality of waveguides. The first plurality of waveguides each has a first end configured to collect light and a second end coupled to a first side of the coupling region. Each of the second plurality of waveguides is coupled to a second side of the coupling region. The coupling region is designed to couple light received from the first plurality of waveguides into one or more of the second plurality of waveguides based on a relative phase difference of the light within each of the first plurality of waveguides. In some such embodiments, the integrated photonic system also includes one or more photodetectors that are designed to receive the light from the one or more of the second plurality of waveguides, such that the light received from each waveguide of the one or more of the second plurality of waveguides is associated with a different propagation direction. As will be appreciated, such a configuration is particularly useful in an optical receiver applications.

According to another example embodiment, an integrated photonic system includes a substrate, one or more optical sources on the substrate, and an optical element on the substrate. The optical element includes a coupling region, a first plurality of waveguides, and a second plurality of waveguides. The first plurality of waveguides each has a first end configured to collect light from at least one of the one or more optical sources and a second end coupled to a first side of the coupling region. Each of the second plurality of waveguides is coupled to a second side of the coupling region. The coupling region is designed to couple light received from one or more of the first plurality of waveguides into the second plurality of waveguides, such that a relative phase difference of the light within each of the second plurality of waveguides is based on which of the first plurality of waveguides the light is received from. As such, the light exits from the second plurality of waveguides at a different propagation direction based on the relative phase difference of the light within each of the second plurality of waveguides. As will be appreciated, such a configuration is particularly useful in an optical transmitter applications.

According to another example embodiment, a method of using a multi-directional optical device includes coupling incident light received at one or more propagation directions into a first plurality of waveguides on a substrate; coupling the light from the first plurality of waveguides into a first side of a coupling region on the substrate; and selectively coupling the light from the coupling region into one or more second waveguides of a plurality of second waveguides at a second side of the coupling region. The one or more second waveguides are selected based on the one or more propagation directions of the received light coupled into the first plurality of waveguides.

According to another example embodiment, a method of using a multi-directional optical device includes transmitting light into one waveguide of a plurality of first waveguides on a substrate; coupling the light from the one waveguide into a first side of a coupling region on the substrate; and coupling the light from the coupling region into each of a second plurality of waveguides coupled to a second side of the coupling region, such that the light exits from each of the second plurality of waveguides at a different propagation direction based on which one of the plurality of first waveguides the light was transmitted into.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

System Architecture

FIG. 1 illustrates an example photonic integrated circuit (PIC) 100 that may be a part of a larger system for collecting, analyzing, transmitting, and/or modulating light. For example, PIC 100 may be used to capture light received from great distances away (such as from space) from different propagation directions. PIC 100 includes a substrate 101 that may be of any material commonly used for photonic applications. Such substrate materials include glass substrates, stiff polymer substrates, or semiconductor substrates.

The glass substrates may include PYREX or Borosilicate glass. The polymer substrates may be sufficiently flexible so as to roll or bend without tearing. Example polymer materials include polydimethysiloxane (PDMS), Parylene, polyethylene glycol (PEG), or polyethylene terephthalate (PET), to name a few examples. Semiconductor substrates may be thin enough to also be flexible and may include materials such as silicon, gallium arsenide, indium phosphide, or any tertiary or quaternary variants thereof, to name a few examples. In some embodiments, the semiconductor substrates include a top cladding material, such as an oxide material, over which various photonic elements like waveguides are formed.

According to some embodiments, PIC 100 includes an optical source 102 and a photodetector 104. Although only one optical source 102 and one photodetector 104 are illustrated, it should be understood that optical source 102 may represent any number of optical sources and likewise that photodetector 104 may represent any number of photodetectors. By having both a source and detector, PIC 100 is capable of simultaneous optical transmission and optical reception. In some embodiments, PIC 100 includes only optical source 102 such that PIC 100 is used only as an optical transmitter. In some embodiments, PIC 100 includes only photodetector 104 such that PIC 100 is used only as an optical receiver.

Optical source 102 may be monolithically integrated into substrate 101, such as one or more diode lasers or light emitting diodes (LEDs) formed from layers having gallium and arsenic or from layers having indium and phosphorous. In some other embodiments, optical source 102 represents one or more light sources that are bonded to substrate 101. Optical source 102 generates light 103 that may be coupled into one or more waveguides patterned on substrate 101.

Photodetector 104 may be monolithically integrated into substrate 101, such as one or more PN junctions formed from a layer having gallium and arsenic or from a layer having indium and phosphorous, or from a layer having doped silicon or doped germanium. In some other embodiments, photodetector 104 represents one or more optical detectors that are bonded to substrate 101. Photodetector 104 receives light 105 that may be coupled into photodetector 104 from one or more waveguides patterned on substrate 101.

PIC 100 includes an optical element having a coupling region 106 with a first plurality of waveguides 108 coupled to a first side of coupling region 106 and a second plurality of waveguides 110 coupled to second side of coupling region 106. In some embodiments, coupling region 106, first plurality of waveguides 108, and second plurality of waveguides 110 together form an N×M star coupler having N inputs and M outputs (or visa-versa). In some embodiments, first plurality of waveguides 108 incudes a greater number of waveguides compared to second plurality of waveguides 110.

First plurality of waveguides 108 each have one end that couples to coupling region 106 and another end designed to either transmit light 112 (when acting as an optical transmitter) or receive light 112 (when acting as an optical receiver). Light 112 may represent free-space light either transmitted from first plurality of waveguides 108 or received by first plurality of waveguides 108. According to some embodiments, each of first plurality of waveguides 108 has substantially the same optical path length. In this context, "substantially the same" refers to optical path lengths that are close to one another based on a concerted effort to design plurality of waveguides 108 to yield optical path lengths that are as close as possible to one another. Accordingly, the physical lengths of each of first plurality of waveguides 108 may be designed to achieve substantially the same optical path lengths amongst first plurality of waveguides 108. In some embodiments, passive or active delay elements may be used on any number of first plurality of waveguides 108 to achieve substantially the same optical path lengths. For example, active delay elements may be used to cancel optical path length differences caused by the wavelength of the light due to dispersion or other reasons. The wavelength of the light could change when used in communication systems that operate with variable wavelength sources.

According to some embodiments, coupling region 106 is formed from the same material as first plurality of waveguides 108 and second plurality of waveguides 110. In some embodiments, coupling region 106, first plurality of waveguides 108, and second plurality of waveguides 110 each include silicon nitride, although any other material that can act as a waveguide core for visible or infrared wavelengths may be used as well. Coupling region 106 may have the shape and form of a star coupler that passively performs Fourier transforms on light passing between its inputs and outputs. Accordingly, coupling region 106 may be constructed to take advantage of the properties of Rowland circles. In a light transmission example, light is received at coupling region 106 from one or more of second plurality of waveguides 110 and is distributed across each of first plurality of waveguides 108 with a linear phase profile across the first plurality of waveguides 108. The slope of the linear phase profile is dependent on which of the one or more waveguides of second plurality of waveguides 110 the light was received from. The light will ultimately exit from first plurality of waveguides 108 as light 112 having a propagation direction based on the linear phase profile. In a light reception example, light is received at coupling region 106 from first plurality of waveguides 108, where the light has a linear phase profile based on a propagation direction of the received light 112. Coupling region 106 is designed to selectively couple the light into one or more of second plurality of waveguides 110 based on the liner phase profile of the light. As noted above, light may be received and transmitted simultaneously using the same PIC 100.

Due to the selective coupling capabilities of coupling region 106 based on the linear phase profile of the light, the propagation direction of received light can be determined based on which of second plurality of waveguides 110 the light is received from. Similarly, the propagation direction of transmitted light can be controlled by selecting which of second plurality of waveguides 110 to transmit light into.

In some embodiments, PIC 100 includes a coupler 114 that may include a multiplexer designed to direct light 103 into selected one or more of second plurality of waveguides 110 and/or receive light 105 from selected one or more of second plurality of waveguides 110. Accordingly, the multiplexer may include a switching network that includes optical switches to direct light into particular waveguides. The optical switches may be microelectromechanical (MEMS) switches to mechanically move portions of waveguides to switch between different paths. Other examples of optical switches include Mach-Zehnder interferometers, or switches that utilize light modulation to direct light down particular paths. The light modulation may be performed using any of electro-optic, thermo-optic, or acousto-optic modulators. In some other embodiments, coupler 114 combines the light received from second plurality of waveguides 110 as light 105 or distributes generated light 103 across each of second plurality of waveguides 110. Accordingly, coupler 114 may include a 1×N multi-mode interference (MMI) coupler, a 1×N star coupler, or any similar coupling element. Although only one coupler 114 is illustrated, it should be understood that coupler 114 may represent any number of discrete couplers. For example, a first coupling element may be used to direct light 103 into one or more of second plurality of waveguides 110 while a second coupling element may be used to receive light 105 from one or more waveguides from second plurality of waveguides 110.

Any of the waveguides discussed above for use on PIC 100 may be strip, ridge, or rib waveguides. Any of the waveguides may include a core material having a first refractive index surrounding by a cladding material having a second refractive index lower than the first refractive index. Furthermore, in some embodiments, the top layer of substrate 101 is a material that acts as a cladding for any of the waveguides.

According to some embodiments, first plurality of waveguides 108 each include modulating elements 116. The modulating elements 116 may be provided to change any of phase, frequency, amplitude, or delay of the propagating light within each of first plurality of waveguides 108. In the illustrated example, modulating elements 116 include phase modulators that can be individually addressable to correct a phase profile of received light 112. Modulating elements 116 may include any of electro-optic, thermo-optic, or acousto-optic modulators.

According to some embodiments, second plurality of waveguides 110 each include modulating elements 118. The modulating elements 118 may be provided to change any of phase, frequency, amplitude, or delay of the propagating light within each of second plurality of waveguides 110. In the illustrated example, modulating elements 118 include phase modulators that can be individually addressable to correct for different phase delays of the propagating light within second plurality of waveguides 110. Modulating elements 118 may include any of electro-optic, thermo-optic, or acousto-optic modulators.

According to some embodiments, PIC 100 includes modulating elements 116 and not modulating elements 118. In some other embodiments, PIC 100 includes modulating elements 118 and not modulating elements 116. In some other embodiments, PIC 100 does not include any of modulating elements 116 or modulating elements 118 (e.g., designs where phase correction occurs digitally via signal processing).

According to an embodiment, optical heterodyning can be performed to mix with the received or transmitted optical light signals for later filtering or tuning. In one example, optical signals having a local oscillator frequency (LO) may be mixed with the light within each of first plurality of waveguides 108 to create a down-converted or up-converted optical signal with a given intermediate frequency (IF). The LO optical signal may also be received by coupling region 106 from the same side as first plurality of waveguides 108. By performing controlled optical mixing of the incoming optical signals, waveform distortion of the received or transmitted optical signals can be corrected digitally through signal processing which may remove the need for phase control via phase modulators. In some other embodiments, knowledge of the phase in the different waveguide outputs after heterodyning may allow optimum control of modulating elements 118 and/or modulating elements 116 to suppress such waveform distortion.

Figure 2B:
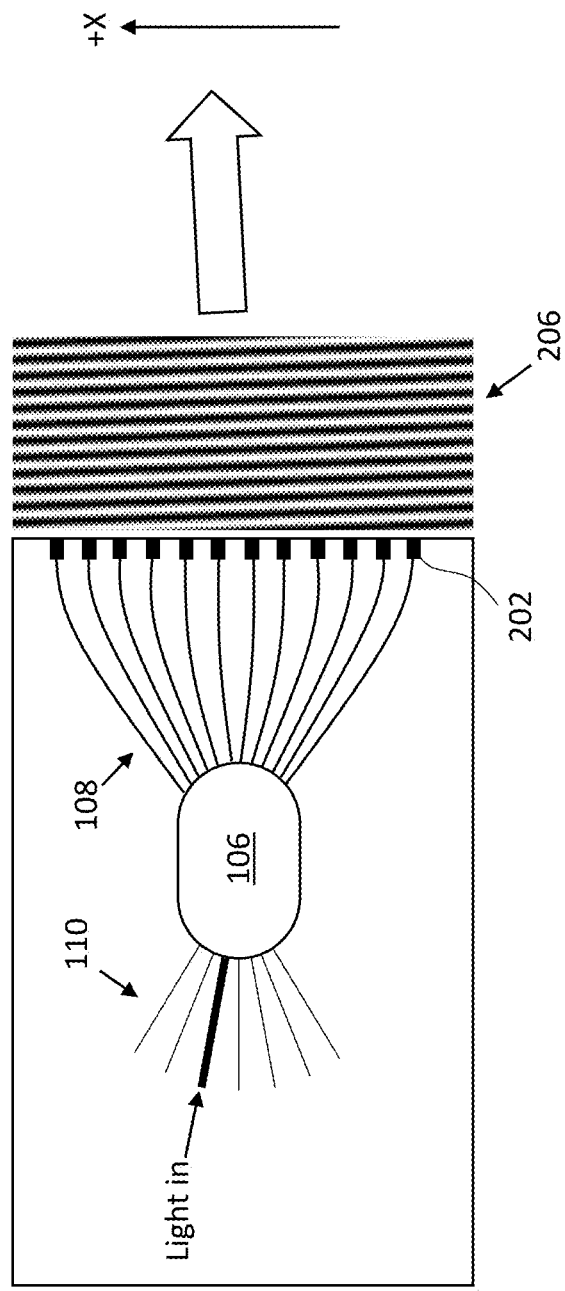

FIGS. 2A-2C illustrate different examples of changing the propagation direction of transmitted light using the star coupler element from PIC 100, according to some embodiments. The various features of the star coupler shown in FIGS. 2A-2C are not necessarily drawn to scale, and some features may be exaggerated for easier viewing.

FIG. 2A illustrates an example where light is transmitted through one of the waveguides of second plurality of waveguides 110 into coupling region 106. The light is then distributed by coupling region 106 into each of first plurality of waveguides 108, where it exits from apertures 202 as free-space light having a propagating wave-front 204. In some embodiments, apertures 202 are arranged to be parallel to one another along a common plane. In some embodiments, apertures 202 represent cleaved facets at the ends of first plurality of waveguides 108. In some embodiments, apertures 202 include grating structures or nano-antennas to affect wave-front 204 of the propagating light. Additional optical elements may be present at or near apertures 202 such as micromirrors or microlenses designed to reflect or focus the light.

In the example illustrated in FIG. 2A, since light is received from a central waveguide of second plurality of waveguides 110, the phase of the light within each of first plurality of waveguides 108 is substantially the same, and thus the light propagates away from apertures 202 in a direction that is substantially perpendicular (as indicated by the arrow) to a line along which each of apertures 202 are placed. Wave-front 204 illustrates no tilt to the phase profile of the exiting light.

FIG. 2B illustrates another example where light is transmitted through one of the waveguides of second plurality of waveguides 110 into coupling region 106. In the example illustrated in FIG. 2B, since light is received from a waveguide that is offset from the central waveguide of plurality of waveguides 110, the phase of the light within each of first plurality of waveguides 108 has a constant phase difference (e.g., a linear phase profile), and thus the light propagates away from apertures 202 at a slight angle from the perpendicular direction (in the positive x direction as indicated by the arrow). Wave-front 206 illustrates a slight tilt to the phase profile of the exiting light. The magnitude of the slope of the linear phase profile is based on which waveguide of second plurality of waveguides 110 the light is received from, with the slope of the linear phase profile increasing for waveguides further away from the central waveguide.

FIG. 2C illustrates another example where light is transmitted through one of the waveguides of second plurality of waveguides 110 into coupling region 106. In the example illustrated in FIG. 2C, light is received from a waveguide that is farthest from the central waveguide of plurality of waveguides 110, thus yielding a constant phase difference (e.g., a linear phase profile), having a greatest possible slope given the illustrated design. Accordingly, the light propagates away from apertures 202 at a larger angle from the perpendicular direction (in the positive x direction as indicated by the arrow). Wave-front 208 illustrates a greater tilt to the phase profile of the exiting light.

It should be understood that the direction of the propagating light can also be in the negative x direction by inputting light through the mirrored waveguides on the other side of the central waveguide of second plurality of waveguides 110, according to an embodiment. Also, light may be transmitted through more than one waveguide of second plurality of waveguides 110, which would yield light propagating at different directions simultaneously.

Figure 3A:
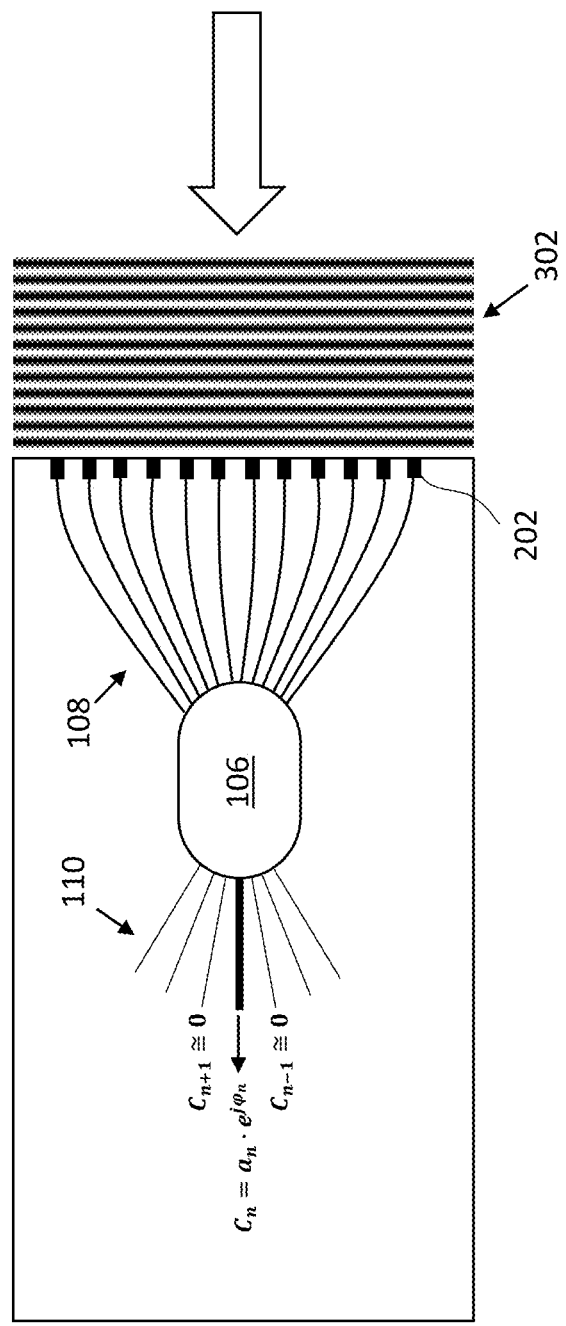
FIGS. 3A and 3B are schematic diagrams that demonstrate additional example operations of an optical element of a photonic integrated circuit, the optical element including a coupling region, a first plurality of waveguides, and a second plurality of waveguides, in accordance with some embodiments of the present disclosure.
Figure 3B:
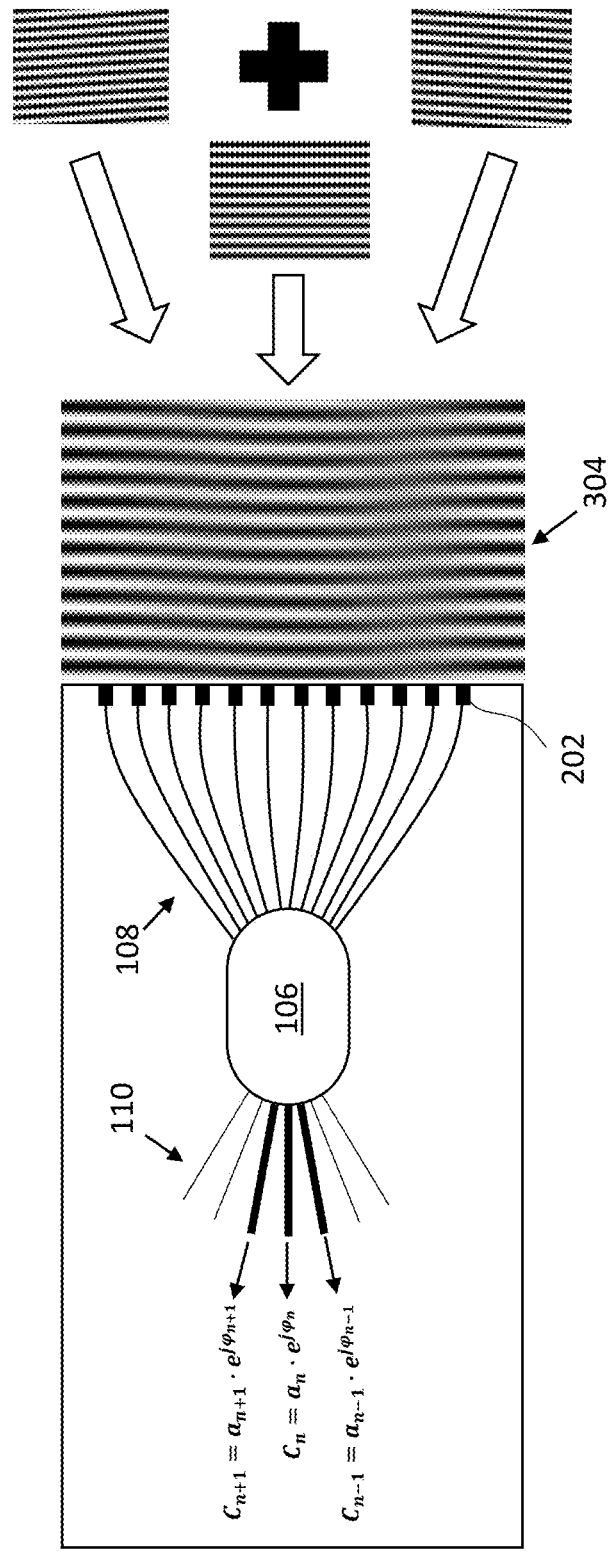

FIGS. 3A and 3B illustrate different examples of receiving light from different propagation directions using the star coupler element from PIC 100, according to some embodiments. The various features of the star coupler shown in FIGS. 3A and 3B are not necessarily drawn to scale, and some features may be exaggerated for easier viewing.

FIG. 3A illustrates light having a wave-front 302 being received by the apertures 202 of first plurality of waveguides 108, according to an embodiment. Since wave-front 302 has a phase profile that is parallel to a line which each of apertures 202 are placed, the collected light within each of first plurality of waveguides 108 will have substantially the same phase (e.g., phase offset is ~0). Once the light having substantially equal phase across each of first plurality of waveguides 108 is received by coupling region 106, the light is directed to the central waveguide of second plurality of waveguides 110. The central waveguide is selected based on the phase difference between the light (in this example, the phase difference is ~0), and the phase difference is determined at least by the propagation direction of the light as it is received by first plurality of waveguides 108. It should be understood that, in some embodiments, the majority of the light is coupled through the central waveguide while some of the light may be coupled through other waveguides of second plurality of waveguides 110. For example, at least 75%, at least 80%, at least 85%, at least 90% or at least 95% of the light is coupled through the central waveguide, with the remaining portion of light coupled through one or more of the other waveguides of second plurality of waveguides 110.

As further illustrated in FIG. 3A, the magnitude of the light received through the middle waveguide $C_n$ of second plurality of waveguides 110 is equal to $a_n \cdot e^{j\varphi_n}$, where $a_n$ represents the zeroth order magnitude of the light and $\varphi_n$ represents the relative phase profile of the light for the given waveguide. Likewise, the magnitude of the light received by each of the adjacent waveguides $C_{n+1}$ and $C_{n-1}$ of second plurality of waveguides 110 is zero or near zero.

FIG. 3B illustrates an example where light is received from more than one direction, resulting in a non-linear wave-front 304, according to an embodiment. Such a situation may occur, for example, when light traverses turbulent atmospheric conditions that distorts the wave-front of the light. In most practical situations, free-space light rarely arrives at its destination without some form of wave-front distortion due to any number of air conditions. In the illustrated example, wave-front 304 can be conceptualized as a combination of three distinct propagation modes or phase profiles (which can be decomposed based on Fourier analysis). Once the light is received by coupling region 106, the light is directed to more than one waveguide of second plurality of waveguides 110 corresponding to the different phase profiles of the received light, according to an embodiment.

For example, light may be coupled into the central waveguide and the waveguides on either side of the central waveguide, as illustrated. So, received light having contributions with no phase difference (mode 1) across each of first plurality of waveguides 108 is coupled into the central waveguide, $C_n$. In addition, received light with some positive phase difference (mode 2) across each of first plurality of waveguides 108 is coupled into the waveguide above the central waveguide, $C_{n+1}$. And received light with some negative phase difference (mode 3) across each of first plurality of waveguides 108 is coupled into the waveguide above the central waveguide, $C_{n-1}$. As further illustrated in FIG. 3B, the magnitude and phase of the light received through the middle waveguide $C_n$ of second plurality of waveguides 110 is equal to $a_n \cdot e^{j\varphi_n}$, as discussed with respect to FIG. 3A. As can be further seen in FIG. 3B, the magnitude and phase of the light received by the upper adjacent waveguide $C_{n+1}$ is equal to $a_{n+1} \cdot e^{j\varphi_{n+1}}$, and the magnitude and phase of the light received by the lower adjacent waveguide $C_{n-1}$ of second plurality of waveguides 110 is equal to $a_{n-1} \cdot e^{j\varphi_{n-1}}$.

Thus, instead of losing non-ideal parts of the incoming light as would happen, for instance, with a standard collimated system that is only sensitive to the ideal mode or component (the component with a flat phase-front), a greater amount of incident light is received by capturing not only ideal mode or component, but also other modes or components which are available at different waveguides in the second plurality of waveguides 110, and these various modes or components can then be photo-detected and digitized separately for further digital processing, depending on the given application. In another example case, the various modes or components can be frequency and/or phase adjusted and coherently combined.

These are just some examples and light may be coupled via coupling region 106 into any number of second plurality of waveguides 110 based on the phase profile of the received light incident on the first plurality of waveguides 108. Additionally, as mentioned above, in some embodiments, the majority of the light is coupled into particular waveguides of second plurality of waveguides 110 based on the phase profile, but some portion of the light may still be coupled into some other or all other waveguides of second plurality of waveguides 110, with each such portion being available for pre-detection processing (e.g., frequency and/or phase adjust for coherent applications), photo-detection of one or more available modes, and post-detection processing (e.g., using the received light signals to control a computer, system, or process).

Figure 4:
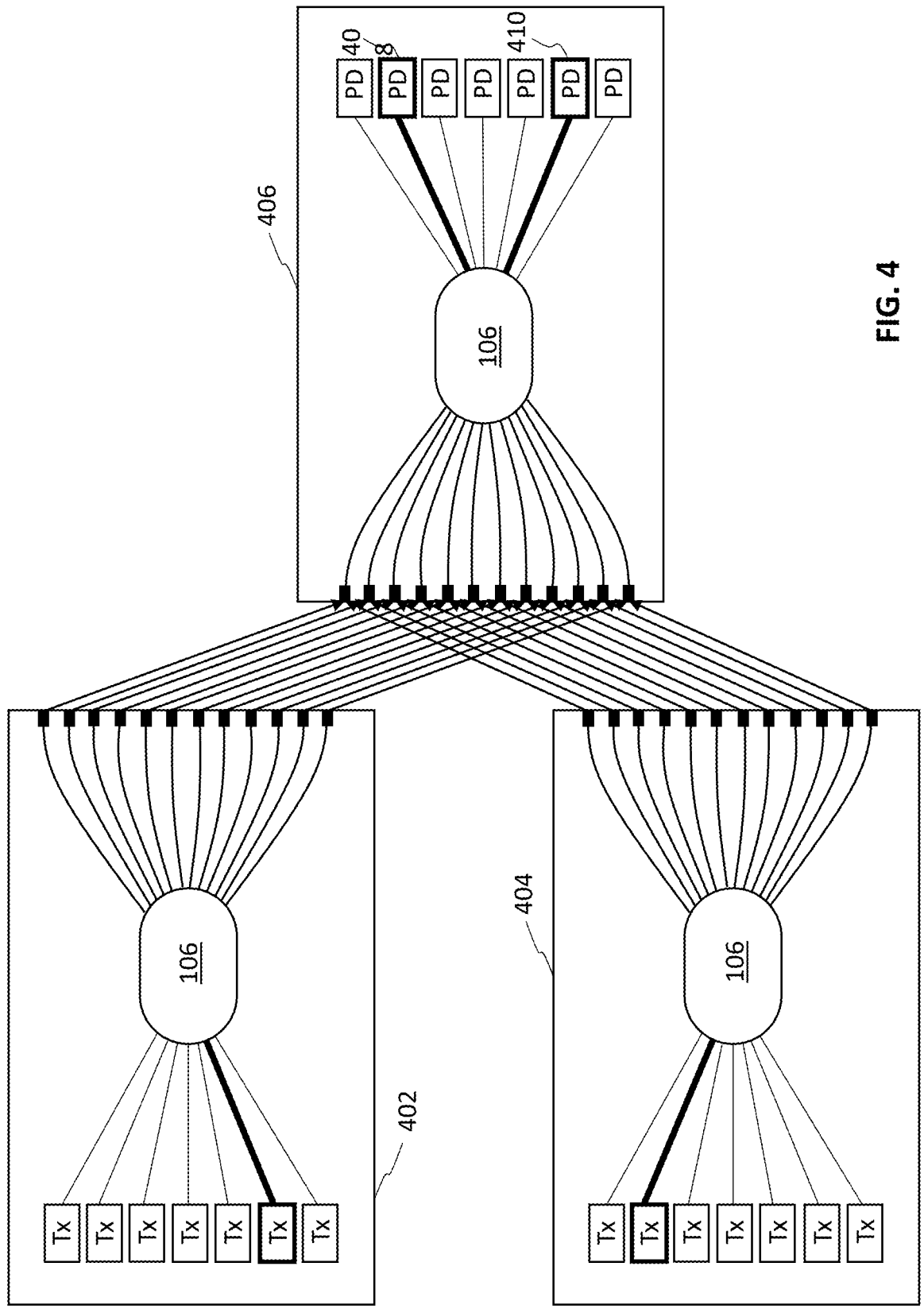
FIG. 4 is a schematic diagram of that demonstrates example operations of a system of photonic integrated circuits, in accordance with an embodiment of the present disclosure.

FIG. 4 illustrates an example of how different transmitters can transmit to the same receiver from different angles and the receiver can distinguish between the transmissions based on the received propagation angle (also referred to herein as propagation direction) of the light. The components may be, for example, part of a system that includes more than one PIC communicating with one another, according to an embodiment. The illustrated example of FIG. 4 includes PIC 402, PIC 404, and PIC 406, each of which may be separate chips communicating across free-space with one another. The separate chips may be within the same device, such as within an optical communication bus of a computer or other host platform. In some embodiments, each of PIC 402, PIC 404, and PIC 406 is integrated into a separately housed device communicating across free-space with one another.

In the example use case shown, PIC 402 and PIC 404 are acting as optical transmitters while PIC 406 is acting as an optical receiver. In other examples, any of PIC 402, PIC 404, and PIC 406 can act as a transmitter or receiver. According to an embodiment, PIC 402 transmits a first beam of light having a first propagation angle towards PIC 406. Similarly, PIC 404 transmits a second beam of light having a second propagation angle towards PIC 406. According to some such embodiments, the propagation angle from each of PIC 402 and PIC 404 is selected by coupling the transmitted light into a particular waveguide on the left side of the coupling region 106. This may be accomplished, for example, by activating an optical source connected to the selected waveguide, or by using an optical switching network and/or modulating elements to direct light from an optical source into a selected waveguide (or waveguides if multi-directional propagation is desired). As can be seen, the active optical source and selected waveguides are shown in bold to distinguish them from non-active sources and non-selected waveguides. As can be further seen in FIG. 4, the light passes through the selected input waveguide and the coupling region 106 to each of the output waveguides on the right side of the coupling region 106, and exits those output waveguides at the propagation angle associated with the selected input waveguide.

Once the transmitted light is received by PIC 406, it is coupled into the receiving waveguides and guided to coupling region 106 on PIC 406 where the light is directed to particular one or more waveguides based on the received propagation angle (direction) of the light. In the illustrated example, the first light received from PIC 402 is received having the first propagation angle, so the first light is coupled into the waveguide that is connected to photodetector 408 while the second light received from PIC 404 is received having the second propagation angle, so the second light is coupled into the waveguide that is connected to photodetector 410. In this way, photodetector 408 receives the first light transmitted by PIC 402 and photodetector 410 receives the second light transmitted by PIC 404. The first light and the second light may be transmitted and received simultaneously or at different times.

In some embodiments, one or more of PIC 402, PIC 404, and PIC 406 is designed as both an optical transmitter and an optical receiver. In one such example embodiment, PIC 402 transmits light to PIC 406 and receives light from PIC 406. Similarly, PIC 404 transmits light to PIC 406 and receives light from PIC 406, and PIC 406 transmits light to one or both PIC 402 and PIC 404 and receives light from one or both PIC 402 and PIC 404. Optical transmitters and receivers may be incorporated on the same PIC as discussed above with reference to FIG. 1. In more detail, and according to some embodiments, various optical elements may be used between coupling region 106 and the optical sources/photodetectors to distinguish between transmitted and received light in bi-directional applications, and/or to generate coherent light or otherwise adjust the light as needed for a given application. Recall that two modes of light are said to be coherent when they have the same frequency and either the same phase or a constant phase difference. Some examples of such optical elements include optical circulators, multiplexers and switching networks, phase modulators, frequency modulators, adaptive lenses, polarization beam splitters, and optical isolators.

Figure 5A:
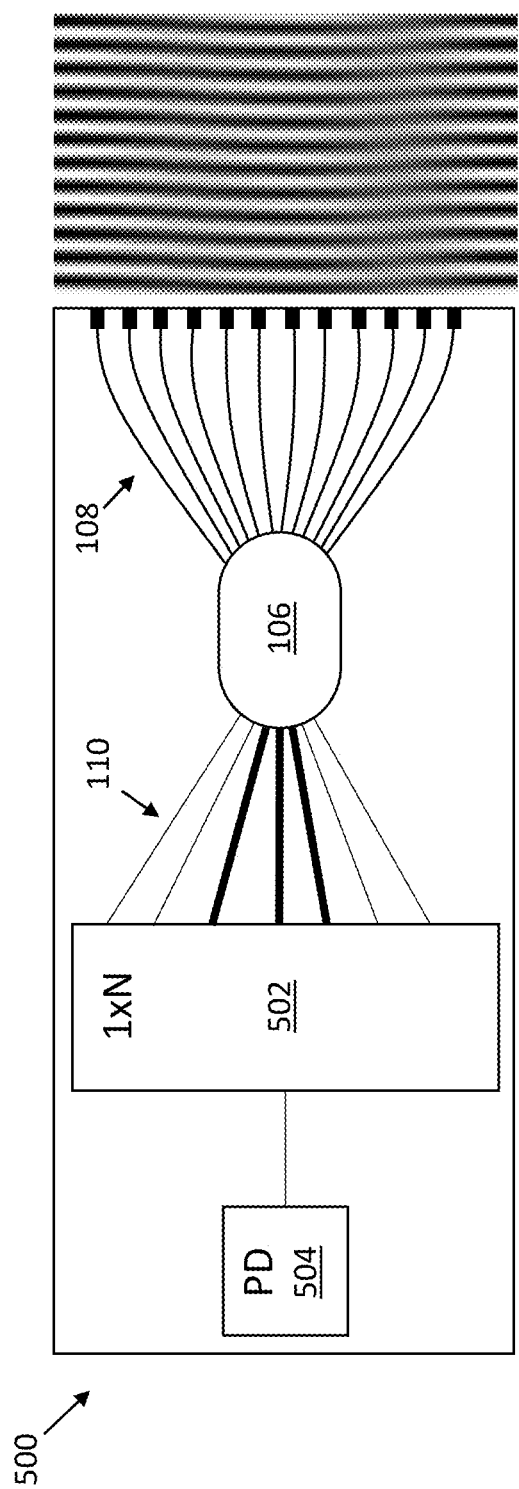
FIGS. 5A and 5B are schematic diagrams of photonic integrated circuits acting as receivers having different output stage designs, in accordance with some embodiments of the present disclosure.
Figure 5B:
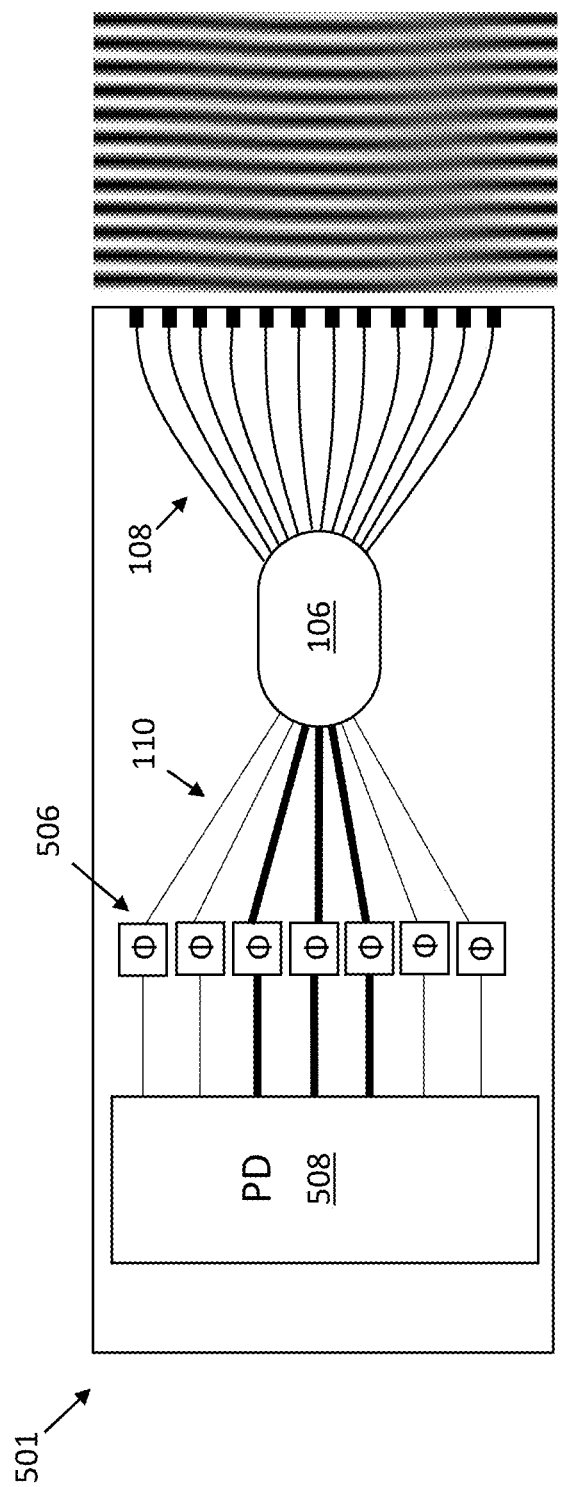

FIGS. 5A and 5B illustrate example photonic circuit receiver designs in accordance with some embodiments. FIG. 5A illustrates a PIC 500 that includes coupling region 106 and a 1×N coupler 502 between second plurality of waveguides 110 and a photodetector 504, according to an embodiment. Coupler 502 may include, for example, a multiplexer that selects one of the N inputs to couple with the single output received by photodetector 504. In some embodiments, coupler 502 uses time division multiplexing to switch between the N inputs to capture light received from more than one input. In some embodiments, coupler 502 is designed to couple any light received from any of waveguides 110 into a single waveguide coupled to photodetector 504. Accordingly, coupler 502 may be a 1×N multi-mode interference (MMI) coupler, a 1×N star coupler, or any similar or comparable coupling element. In embodiments where coupler 502 combines the light received from waveguides 110, modulating elements may be used on each of waveguides 110 to adjust the light that is received by photodetector 504. Example modulating elements may include phase or frequency modulating elements. For instance, optical phase modulators on each of waveguides 110 can be used to compensate for the relative phase delays of the different components (e.g., $\varphi_n$, $\varphi_{(n-1)}$, $\varphi_{(n+1)}$, etc) and then combine all of them together coherently before photodetection.

FIG. 5B illustrates another PIC 501 that includes coupling region 106 and a plurality of phase modulating elements 506 on second plurality of waveguides 110 before the waveguides are coupled to a photodetector 508. As noted above, photodetector 508 can represent any number of photodetectors such that each of waveguides 110 may be coupled to a separate photodetector. Phase modulating elements 506 can be used, for instance, to adjust the phase of the light within each of second plurality of waveguides 110 in order to facilitate coherency of the light received by photodetector 508. Phase modulating elements 506 may include one or more of electro-optic modulators, thermo-optic modulators, or acousto-optic modulators. In some embodiments, other modulators are used in place of, or with, phase modulating elements 506, such as frequency modulators, amplitude modulators, or delay elements. In a more general sense, the received light can be adjusted (e.g., amplified, phase-adjusted, frequency-adjusted, and/or filtered) or otherwise processed to facilitate its detection for a given application.

For each of PIC 500 or PIC 501, in some embodiments, additional modulating elements can be used with first plurality of waveguides 108 to provide a correction to the phase profile of the incident light. The additional modulating elements may include, for example, a phase modulating element coupled to each of first plurality of waveguides 108, although any light processing component can be used (e.g., filters, frequency adjusters, phase adjusters, adaptive lenses).

Figure 6:
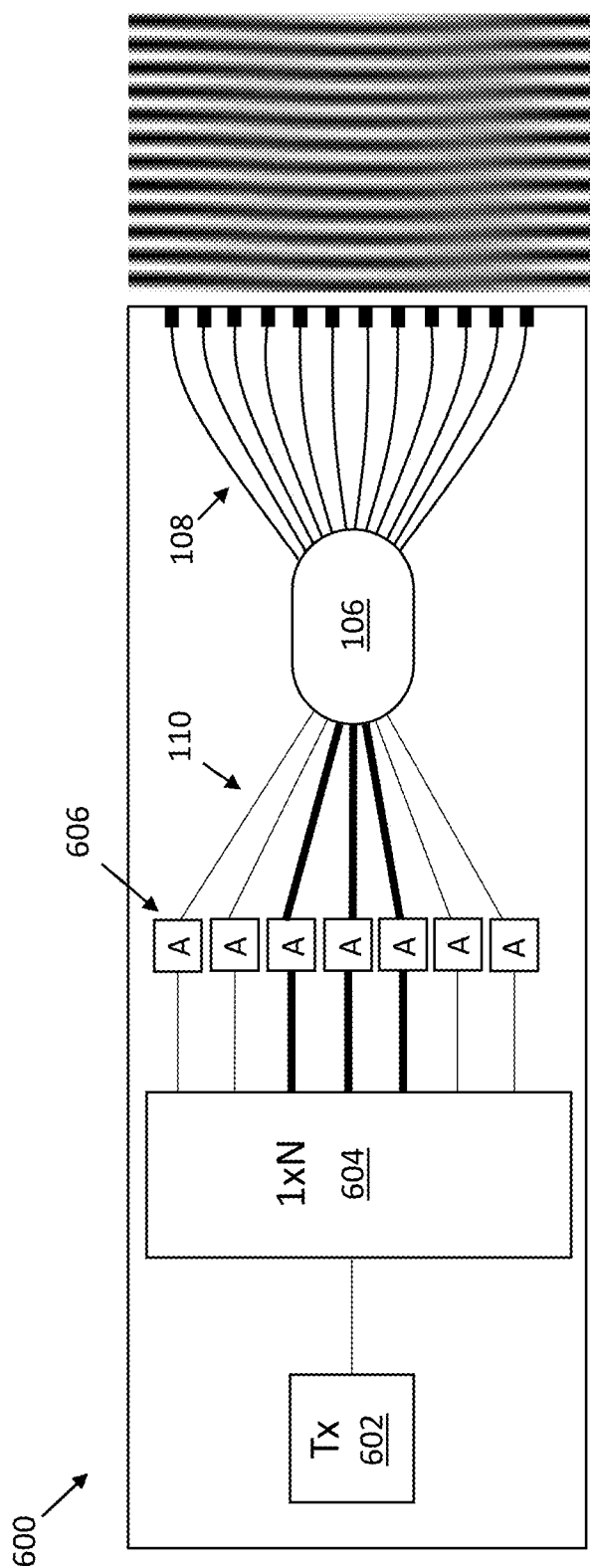
FIG. 6 is a schematic diagram of a photonic integrated circuit acting as a transmitter with a particular input stage design, in accordance with an embodiment of the present disclosure.

FIG. 6 illustrates an example PIC 600 that acts as a photonic transmitter in accordance with some embodiments. PIC 600 includes coupling region 106 and a 1×N coupler 604 between second plurality of waveguides 110 and an optical source 602, according to an embodiment. Coupler 604 may include, for example, a multiplexer that selects one of the N outputs to couple with the single input received from source 602. In some embodiments, coupler 604 uses time division multiplexing to switch between the N outputs to transmit the light generated from source 602 into more than one waveguide of second plurality of waveguides 110. In some embodiments, coupler 604 is designed to couple the light received from source 602 into each of second plurality of waveguides 110. Accordingly, coupler 604 may be a 1×N multi-mode interference (MMI) coupler, a 1×N star coupler, or any similar coupling element.

According to some embodiments, each of second plurality of waveguides 110 includes an amplitude modulating element 606. Each amplitude modulating element 606 may be individually controlled to change the amplitude of the light within the corresponding waveguide. For example, amplitude modulating elements 606 may be controlled to apply no amplitude modulation to the three central waveguides (as illustrated), while reducing the amplitude to near 0 for the other waveguides. Any amplitude modulating schemes may be realized using amplitude modulating elements 606. According to some embodiments, amplitude modulating elements 606 may be one or more of electro-optic modulators, thermo-optic modulators, or acousto-optic modulators. In some embodiments, additional modulating elements, such as phase modulators and/or frequency modulators, are also provided on each of second plurality of waveguides 110.

According to some embodiments, additional modulating elements are used with first plurality of waveguides 108 to provide, for example, a correction to the phase and/or frequency profile of the transmitted light. The additional modulating elements may include, for instance, a phase modulating element coupled to each of first plurality of waveguides 108.

Figure 7:
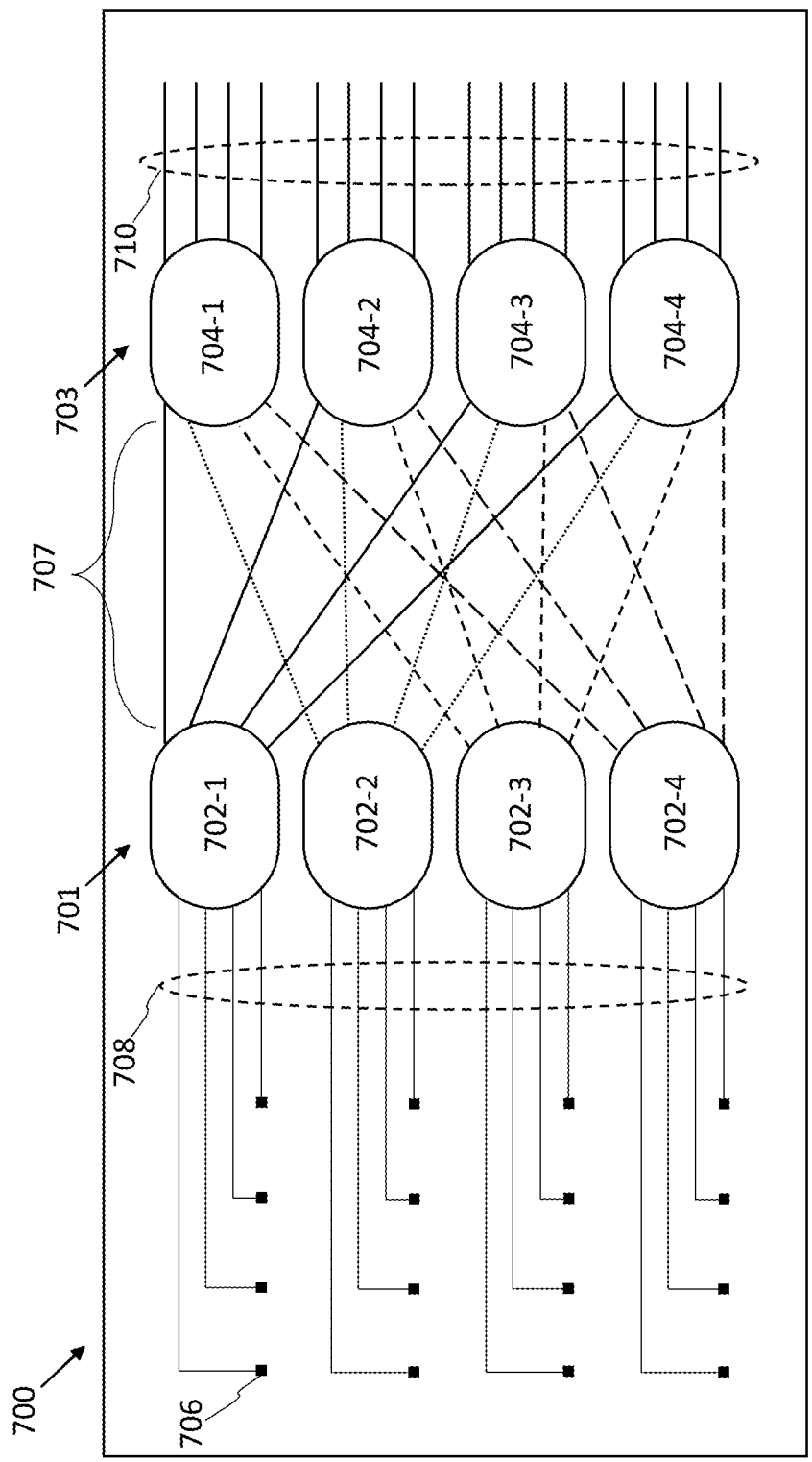
FIG. 7 is a schematic diagram of a photonic integrated circuit having a plurality of interconnected optical elements, in accordance with an embodiment of the present disclosure.

Various ones of the PIC embodiments discussed above received and/or transmitted light along a 1-dimensional array of output waveguides. However, in some embodiments, any of the PIC designs discussed herein may be adapted to receive and/or transmit light across a 2-dimensional area by arranging waveguide apertures in a 2D pattern on a substrate. FIG. 7 illustrates an example PIC 700 that includes a first plurality of optical elements 701 each having a coupling region 702-1 to 702-4, with each coupling region 702-1 to 702-4 having waveguides 707 connected to additional coupling regions 704-1 to 704-4 of a second plurality of optical elements 703 in order to capture or transmit light from a 2D array of apertures 706 connected to a first plurality of waveguides 708, according to an embodiment. Each of coupling regions 702-1 to 702-4 and coupling regions 704-1 to 704-4 may be, for example, star couplers that are designed to couple the light between its various waveguides as described above with reference to FIGS. 2 and 3. Although the illustrated example includes a 4×4 array of apertures 706 along with 8 total coupling regions, it should be understood that any sized array of apertures 706 can be designed along with any number of coupling regions to interface with the 2D array of apertures 706.

According to an embodiment, each coupling region of first plurality of optical elements 701 includes a subset of first plurality of waveguides 708 coupled to one side of a corresponding coupling region. A distal end of first plurality of waveguides 708 includes an aperture 706 for transmitted light or receiving light. Each aperture 706 may include any of a cleaved waveguide facet, an angled facet, a grating structure, a nano-antenna, a micromirror, or other such optical element, to facilitate reception of light into waveguides 708 via apertures 706.

Each waveguide of a second plurality of waveguides 707 connects one coupling region from first plurality of optical elements 701 to one coupling region of second plurality of optical elements 703. For example, each coupling region 702-1 to 702-4 includes a first waveguide connected to coupling region 704-1, a second waveguide connected to coupling region 704-2, a third waveguide connected to coupling region 704-3, and a fourth waveguide connected to coupling region 704-4. Put another way, each coupling region 702-1 to 702-4 includes waveguides that are each coupled to a different coupling region of coupling regions 704-1 to 704-4, and vice versa. The different line styles (solid and dashed) in the figure are used to differentiate which waveguides of the second plurality 707 are associated with each of coupling regions 702-1 to 702-4.

According to an embodiment, when light is received by the array of 2D apertures 706, it is coupled into first plurality of waveguides 708 and received by each of first plurality of optical elements 701. Focusing on coupling region 702-1, the light is received and directed to one or more of the solid-line waveguides of second plurality of waveguides 707 based on the propagation direction of the received light. A similar process occurs for each other coupling region 702-2 to 702-4. Based on which waveguides of second plurality of waveguides 707 the light was coupled into, not all coupling regions 704-1 to 704-4 may receive light. For example, if light was received at such an angle that each of coupling regions 702-1 to 702-4 directed light primarily into its corresponding top waveguide of second plurality of waveguides 707, then only coupling region 704-1 would receive substantial light energy. Of course, as noted previously, in some embodiments, at least some portions of the light are coupled by coupling regions 702-1 to 702-4 into each of its waveguides of second plurality of waveguides 707.

Each of coupling regions 704-1 to 704-4 receives the light via second plurality of waveguides 707 and couples the light into one or more of a third plurality of waveguides 710. One or more photodetectors may be coupled to third plurality of waveguides 710. According to an embodiment, a propagation angle of the received light across the 2D array of apertures 706 will affect which waveguides of third plurality of waveguides 710 the light is ultimately coupled into. The working principle as described above with reference to FIGS. 3A and 3B is equally applicable here, but expanded to determine light propagation direction across a 2D area.

In a light transmission example, light is transmitted through one or more of third plurality of waveguides 710 and into coupling regions 704-1 to 704-4, according to an embodiment. Each of coupling regions 704-1 to 704-4 will couple the received light into the corresponding second plurality of waveguides 707, where the light from each of coupling regions 704-1 to 704-4 will have a linear phase offset based on which of third plurality of waveguides 710 the light was received from.

Each of coupling regions 702-1 to 702-4 receives the light via second plurality of waveguides 707 and couples the light into one or more of first plurality of waveguides 708. The light within first plurality of waveguides 708 ultimately is transmitted out from the array of 2D apertures 706 at a propagation direction based on which of third plurality of waveguides 710 the light was transmitted into. The working principle as described above with reference to FIGS. 2A-2C is equally applicable here, but expanded to control light propagation direction across a 2D area.

Figure 8A:
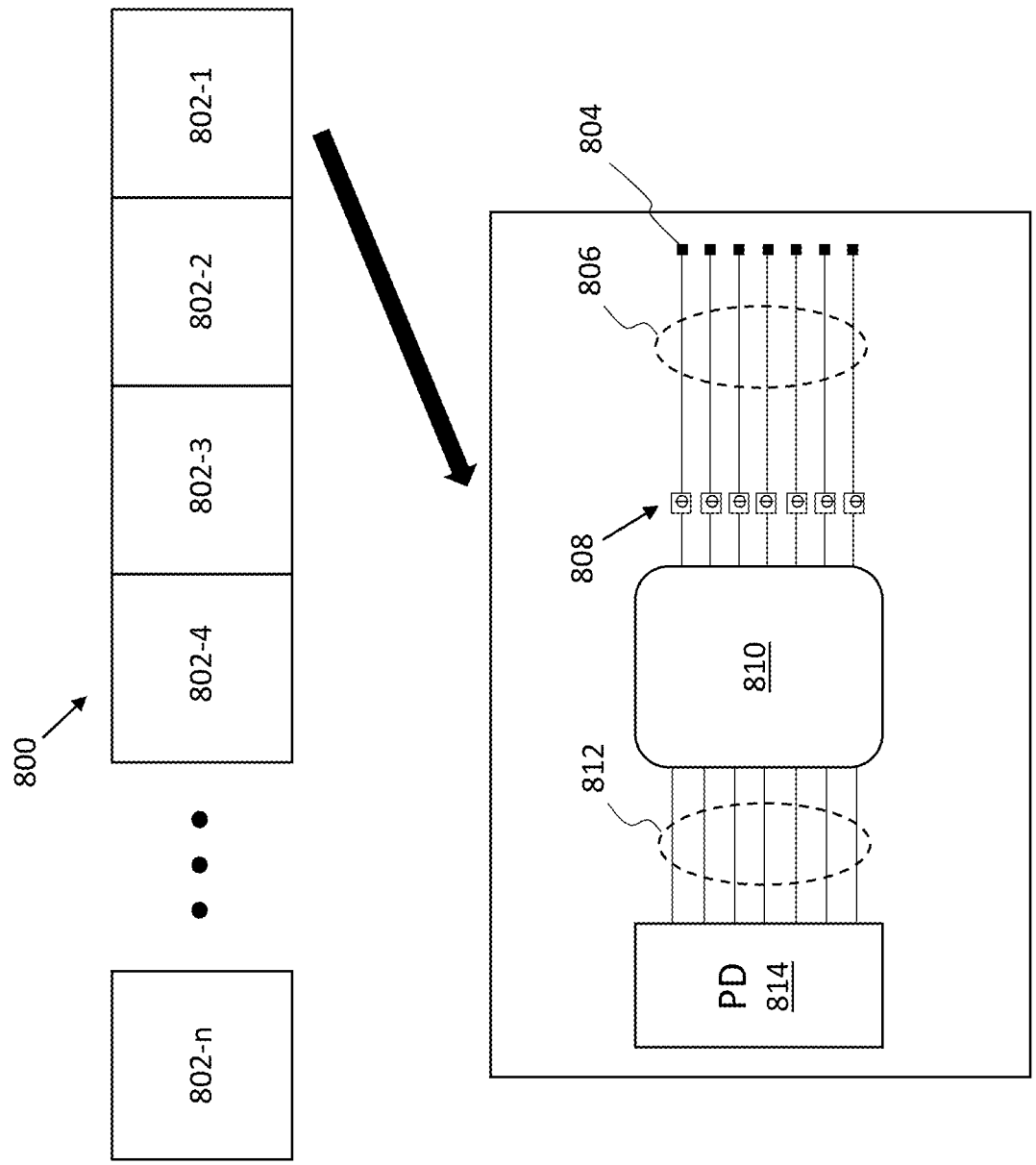
FIG. 8A is a schematic diagram of another photonic integrated circuit having an array of optical elements, in accordance with an embodiment of the present disclosure.

FIG. 8A illustrates another example PIC 800 that includes an array of cells 802-1-802$n$, with each cell including its own linear array of apertures 804 to receive or transmit light, according to some embodiments. Cell 802-1 is shown in more detail in FIG. 8. Although a linear array of cells 802-1-802-$n$ is illustrated, a 2D array of cells may also be used with any number of cells in each row or column of the array. Similar to apertures 706, each aperture 804 may include any of a cleaved waveguide facet, an angled facet, a grating structure, a nano-antenna, a micromirror, or other such optical element, to facilitate reception of light into waveguides 806 via apertures 804.

According to some embodiments, any or each of waveguides 806 include modulating elements 808. The modulating elements 808 may be provided to change any of phase, frequency, amplitude, or delay of the propagating light within each of waveguides 806. In the illustrated example, modulating elements 808 include phase modulators that can be individually addressable to correct a phase profile of light received via apertures 804. Modulating elements 808 may include any of electro-optic, thermo-optic, or acousto-optic modulators.

Each cell of PIC 800 includes an optical element having a coupling region 810 with waveguides 806 coupled to a first side of coupling region 810 and waveguides 812 coupled to second side of coupling region 810. In some embodiments, coupling region 810, waveguides 806, and waveguides 812 together form an N×M star coupler having N inputs and M outputs (or visa-versa). Coupling region 810 may be similar in function and design to coupling region 106 as described above.

Waveguides 812 are coupled between coupling region 810 and a photodetector 814. As discussed above, photodetector 814 can represent any number of photodetectors such that each of waveguides 812 may be coupled to a separate photodetector. The function and design of photodetector 814 may be similar to photodetector 104 as described above.

Figure 8C:
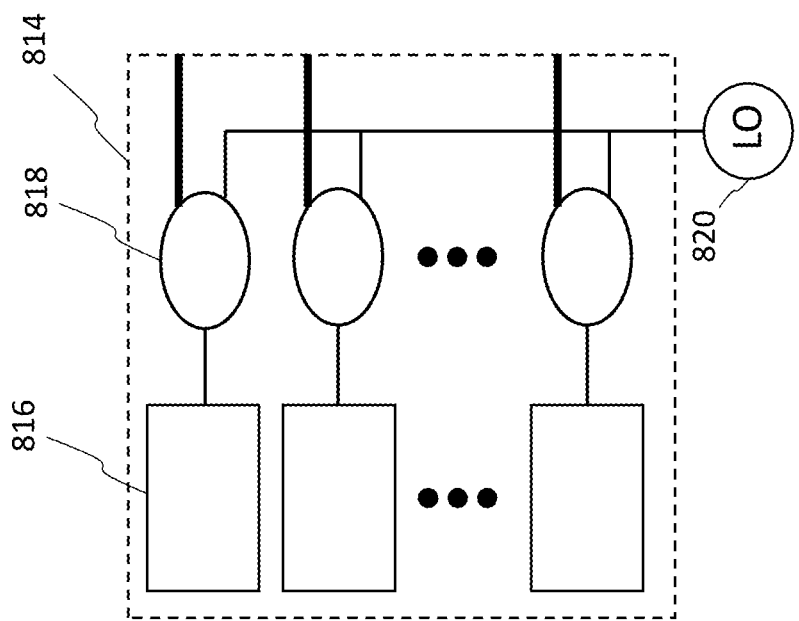
FIGS. 8B-8D are schematic diagrams of different photodetector designs for use in any of the photonic integrated circuits, in accordance with some embodiments of the present disclosure.
Figure 8B:
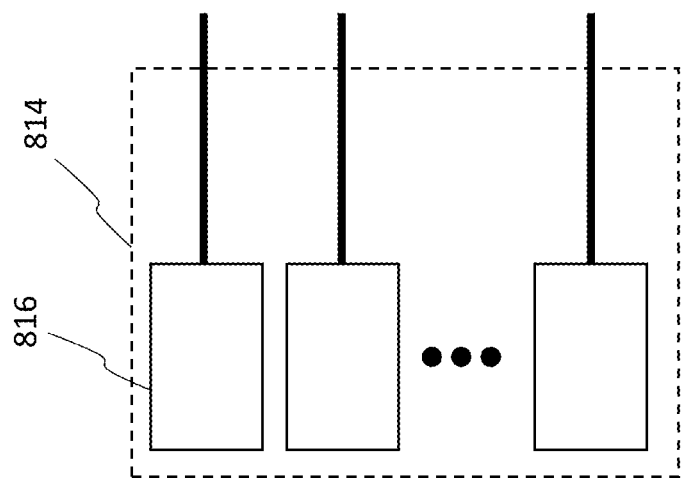
Figure 8D:
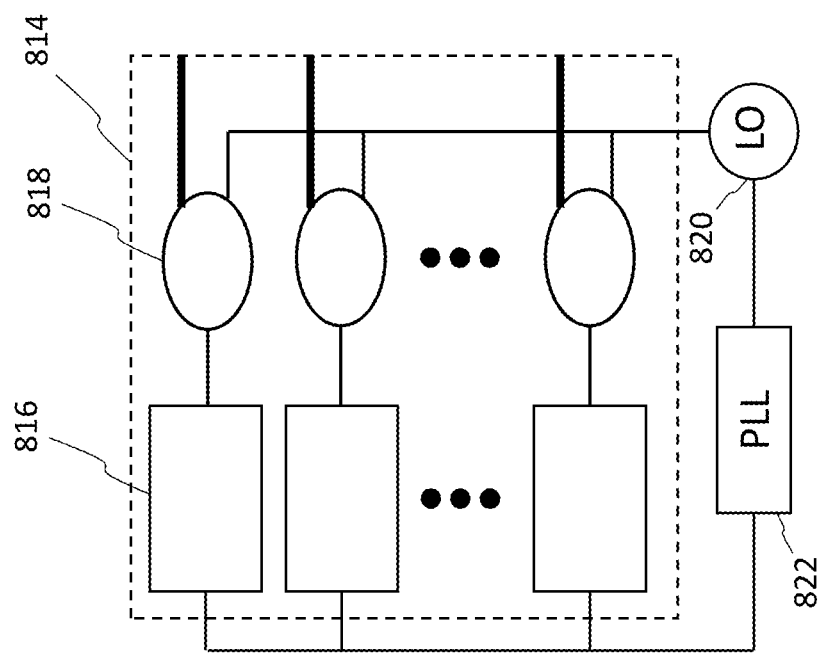

FIGS. 8B-8D illustrate some example designs for photodetector 814. In FIG. 8B, photodetector 814 includes an array of light sensors 816 that can each include one or more PN diodes, PIN diodes, avalanche photo diodes (APD), or single-photon avalanche diodes (SPAD). Each of waveguides 812 (identified by the bolded lines) may be coupled to a corresponding sensor 816.

In FIG. 8C, the light from each of waveguides 812 (identified by the bolded lines) is mixed at mixer 818 with a local oscillator optical signal provided by oscillator 820 before the mixed light is received by a corresponding sensor 816, according to an embodiment. Mixer 818 can be any type of unbalanced, balanced or quadrature (IQ) mixer, and in some embodiments, it is implemented by means of one or more multi-mode interference (MMI) couplers. The LO signal from oscillator 820 may have a fixed frequency to perform frequency downconversion of the received optical signal from each of waveguides 812.

In FIG. 8D, the light from each of waveguides 812 (identified by the bolded lines) is mixed at mixer 818 with a local oscillator optical signal provided by oscillator 820 before the mixed light is received by a corresponding sensor 816 similar to the embodiment from FIG. 8C. Mixer 818 can be any type of unbalanced, balanced or quadrature (IQ) mixer, and in some embodiments it is implemented by means of one or more multi-mode interference (MMI) couplers. However, the frequency of the LO signal from oscillator 820 may be affected by a phase locked loop (PLL) 822 that uses feedback from the sensors 816 to stabilize and/or control the LO frequency of oscillator 820.

It should be noted that the various photodetector embodiments described with reference to FIGS. 8B-8D are applicable to any of the photodetectors from any of the photonic integrated circuits described herein.

Figure 9:
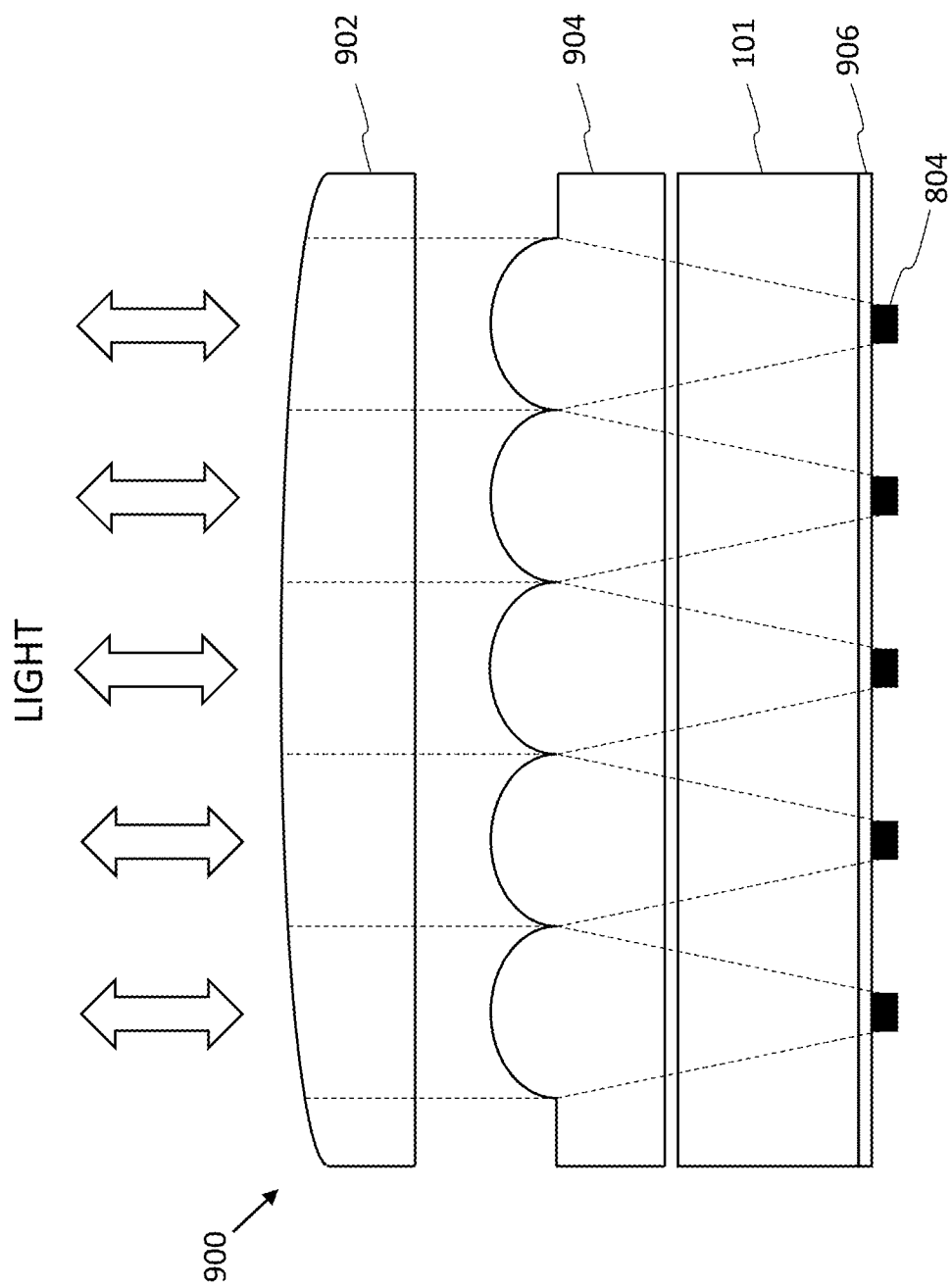
FIG. 9 is a schematic diagram of a lens arrangement for use with the photonic integrated circuit of FIG. 8, in accordance with an embodiment of the present disclosure.

In PIC 700, analyzing light reception (or controlling transmission) across a 2D area was achieved using cascaded optical elements 701 and 703. In PIC 800, the use of cascaded optical elements has been replaced with the use of a separate lens arrangement to achieve a similar 2D Fourier transform of the light. FIG. 9 illustrates an example lens arrangement 900 used to couple light into or out of apertures 804, according to some embodiments. Lens arrangement 900 may be bonded or otherwise aligned over one side of substrate 101 to collect or transmit light through a thickness of substrate 101 to the apertures 804 on the opposite side of substrate 101. Accordingly, substrate 101 is a material that is substantially transparent to the wavelengths of light being used, according to an embodiment. In one example, substrate 101 is a silicon substrate and the light is infrared light.

Lens arrangement 900 includes a first cylindrical lens 902 that extends across each of the cells in PIC 800, according to an embodiment. In some examples, cylindrical lens 902 is an acylindrical lens. Cylindrical lens 902 affects light focusing in only one direction and can be used in a Fourier transforming configuration to provide a similar 1D Fourier transform effect to one of the stages of the cascaded optical elements in PIC 700. In some embodiments, lens arrangement 900 also includes a lens array 904. Lens array 904 may extend across each of the cells in PIC 800, or a separate lens array 904 may be aligned over the apertures 804 of each cell in PIC 800. Lens array 904 may include any type of lens that focuses the light onto a given aperture 804 through substrate 101. In some examples, an anti-reflective (AR) coating 906 is used on the same surface of substrate 101 as apertures 804.

Figure 10:
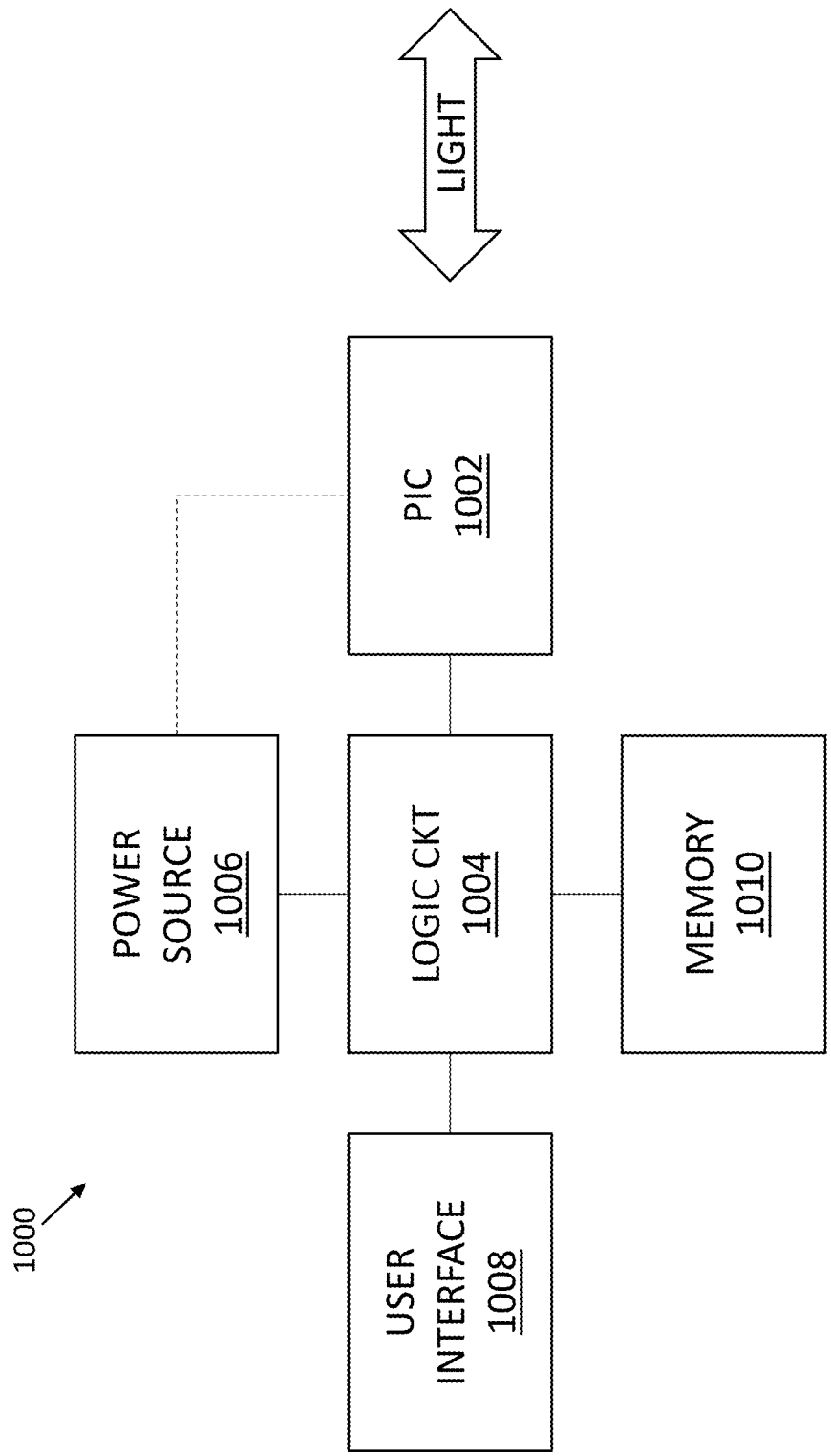
FIG. 10 is an illustration of an electrical device that includes a photonic integrated circuit, in accordance with some embodiments of the present disclosure.

FIG. 10 illustrates an example device 1000 that includes a PIC 1002 along with electrical components to interface with PIC 1002, such as a logic circuit 1004, a power source 1006, and a user interface 1008, according to some embodiments. PIC 1002 may represent any of the PIC designs described herein to transmit and/or receive free-space light.

According to an embodiment, logic circuit 1004 may include any combination of hardware and/or software used to control various components of PIC 1002 or to receive and analyze electrical signals from the one or more photodetectors on PIC 1002. For example, logic circuit 1004 may provide electrical signals to control one or more of the active optical modulators (e.g., phase, frequency, or amplitude modulators) on PIC 1002, or to control selective switching elements such as optical multiplexers. Logic circuit 1004 may receive electrical output from the one or more photodetectors to determine the propagation direction of received light based on characteristics of the received signals, and/or which photodetectors signals are received from. In some embodiments, logic circuit 1004 may control one or more optical sources and/or modulating elements to transmit light at given times or at certain propagation directions.

Logic circuit 1004 may represent any number of processors or processing devices. In some embodiments, logic circuit 1004 includes any suitable processor and may include one or more coprocessors or controllers to assist in control and processing operations associated with PIC 1002. In some embodiments, the processor may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code.

Logic circuit 1004 may be designed to execute code or software stored in memory 1010. According to some embodiments, memory 1010 can be implemented using any suitable type of digital storage including, for example, flash memory and/or random-access memory (RAM). In some embodiments, memory 1010 may include various layers of memory hierarchy and/or memory caches. Memory 1010 may be implemented as a volatile memory device such as, but not limited to, a RAM, dynamic RAM (DRAM), or static RAM (SRAM) device. Note that the code or instructions may be used, for instance, to control light sources that are fed to PIC 1002, or to switch on one or more optical elements (e.g., phase adjusters, etc.) depending on the application, or to set the sensitivity or other settable parameters of photo-detectors that receive light from PIC 1002, A power source 1006 may be included within device 1000 to provide power to the various electrical components of device 1000, according to an embodiment. Power source 1006 may represent any known energy storage component, such as batteries or capacitors and/or circuitry for coupling components of device 1000 to an energy source separate from device 1000 (e.g., AC line power).

According to some embodiments, user interface 1008 may include any means for a user to interact with device 1000. User interface 1008 may include devices (not shown) such as a display element, touchpad, keyboard, mouse, speaker, etc. Accordingly, a user may interact with device 1000 using inputs via a touchpad, keyboard, or mouse, and may read out information received via a display. In some embodiments, a user may receive audio outputs from device 1000.

Methodology

Figure 11:
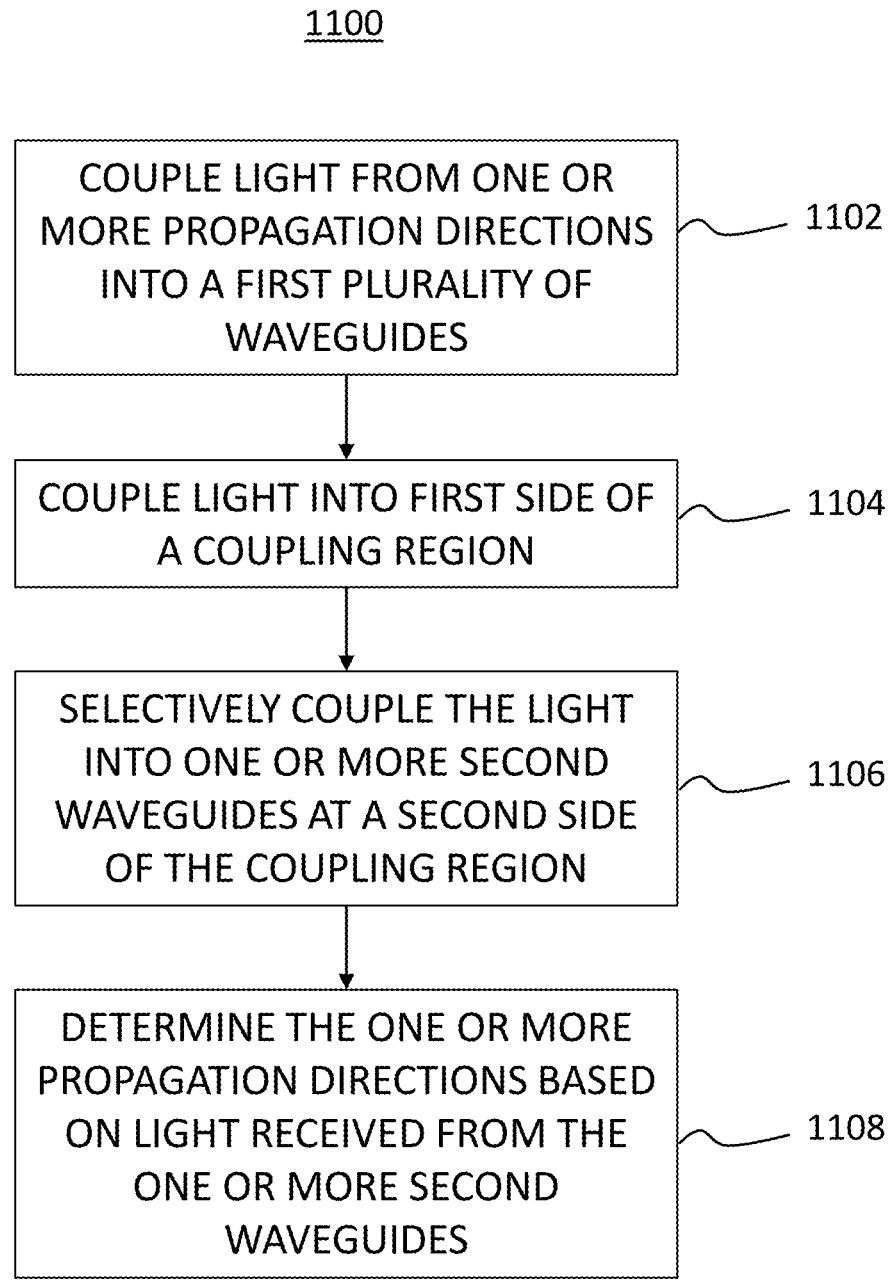
FIG. 11 is a flow chart of an example method of using a multi-directional optical device to determine one or more propagation directions of received light, in accordance with some embodiments of the present disclosure.

FIG. 11 illustrates an example method 1100 for using a multi-directional optical device to receive light from one or more propagation directions, in accordance with certain embodiments of the present disclosure. As can be seen, the example method includes a number of phases and sub-processes, the sequence of which may vary from one embodiment to another. However, when considered in the aggregate, these phases and sub-processes form a process for receiving light from multiple propagation direction and determining the propagation directions of the received light, as described above, for example, with reference to FIGS. 3A and 3B. The method may be implemented on any of the various PIC embodiments described herein, however other system architectures can be used in other embodiments, as will be apparent in light of this disclosure. To this end, the correlation of the various functions shown in FIG. 11 to the specific components illustrated in the other figures is not intended to imply any structural and/or use limitations. Numerous variations and alternative configurations will be apparent in light of this disclosure.

Method 1100 begins with operation 1102 where light is received from one or more propagation directions and coupled into a first plurality of waveguides, according to an embodiment. The light may have any wavelength between around 400 nm and around 2000 nm. The light may be received by apertures aligned along a plane across a substrate that also includes the first plurality of waveguides. The apertures may include optical elements designed to receive and couple the light into corresponding waveguides, such as grating structures, micromirrors, nano-antennas. In some embodiments, the apertures are arranged in a 2D array across a surface of the substrate. In some examples, light is received directly by cleaved facets at the ends of the first plurality of waveguides. In some examples, light is coupled via one or index-matching structures or optical elements, such as optical gratings, microlenses or micromirrors, into the first plurality of waveguides. According to some embodiments, the light within the first plurality of waveguides has a phase profile that is dependent upon the propagation direction of the received light.

Method 1100 continues with operation 1104 where the light in the first plurality of waveguides is coupled into a first side of a coupling region, according to an embodiment. The coupling region may have the form of a star coupler. The star coupler may be formed on the substrate from the same material as the first plurality of waveguides.

Method 1100 continues with operation 1106 where the light is selectively coupled into one or more second waveguides at a second side of the coupling region, according to an embodiment. The coupling region is designed to couple the received light into particular ones of the one or more second waveguides based on the phase profile of the received light, as discussed in more detail above with reference to FIGS. 2A-2C.

Method 1100 continues with operation 1108 where the one or more propagation directions of the received light are determined based on which of the one or more second waveguides light is received from, according to an embodiment. Light from the one or more second waveguides may be received by one or more photodetectors to be transduced into electrical signals. In some embodiments, the determined propagation direction of the light can be used to determine where the light was transmitted from, and thus identify a particular source of the transmitted light. The one or more propagation directions may be determined using a processor (such as discussed with respect to logic circuit 804) configured to receive electrical signals from one or more photodetectors receiving the light from the one or more second waveguides.

Figure 12:
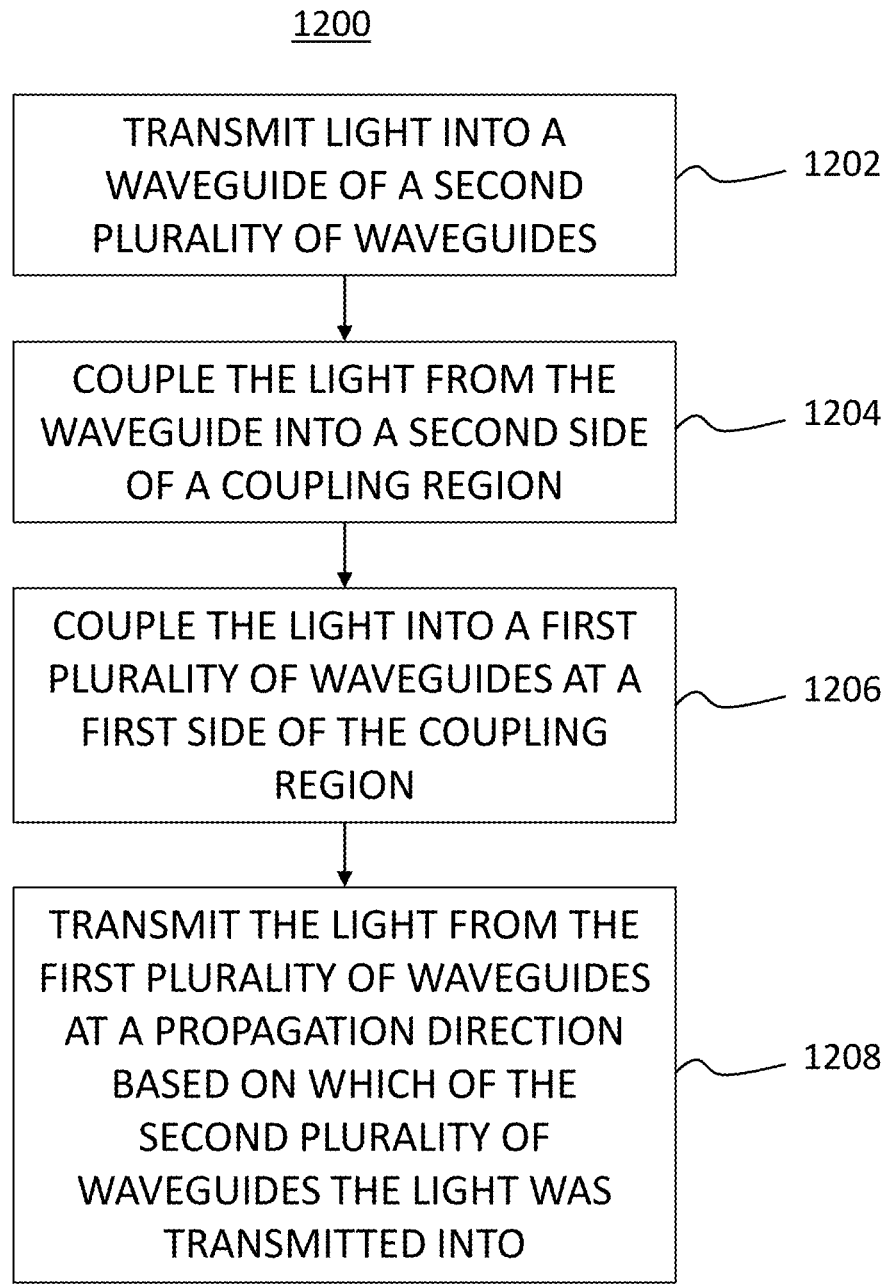
FIG. 12 is a flow chart of an example method of using a multi-directional optical device to transmit light at different propagation directions, in accordance with some embodiments of the present disclosure.

FIG. 12 illustrates an example method 1200 for using a multi-directional optical device to transmit light at one or more propagation directions, in accordance with certain embodiments of the present disclosure. As can be seen, the example method includes a number of phases and sub-processes, the sequence of which may vary from one embodiment to another. However, when considered in the aggregate, these phases and sub-processes form a process for controlling the transmission of light at multiple propagation directions, as described above, for example, with reference to FIGS. 2A-2C. The method may be implemented on any of the various PIC embodiments described herein, however other system architectures can be used in other embodiments, as will be apparent in light of this disclosure. To this end, the correlation of the various functions shown in FIG. 12 to the specific components illustrated in the other figures is not intended to imply any structural and/or use limitations. Numerous variations and alternative configurations will be apparent in light of this disclosure.

Method 1200 begins with operation 1202 where light is transmitted into a waveguide of a first plurality of waveguides, according to an embodiment. The waveguide may be selectively chosen by activating a particular optical source coupled to the selected waveguide, by using an optical switching network to direct light into a particular waveguide, or by using modulating elements to suppress and/or amplify light in particular waveguides of the first plurality of waveguides. The optical source used to generate the transmitted light may be a laser or LED. In some embodiments, light can be transmitted into more than one waveguide of the first plurality of waveguides in order to transmit light at more than one propagation direction simultaneously.

Method 1200 continues with operation 1204 where the light is coupled from the first plurality of waveguides into a first side of a coupling region, according to an embodiment. The coupling region may have the form of a star coupler. The star coupler may be formed on the substrate from the same material as the first plurality of waveguides.

Method 1200 continues with operation 1206 where the light is coupled into a second plurality of waveguides at a second side of the coupling region, according to an embodiment. The coupling region is designed such that the light is coupled into the second plurality of waveguides with a phase profile dependent on which of the first plurality of waveguides the light was received from, as discussed in more detail above with reference to FIGS. 2A-2C. The phase profile determines the ultimate propagation direction of the light as it exits from the second plurality of waveguides.

Method 1200 continues with operation 1208 where the light is transmitted from the second plurality of waveguides at a propagation direction dependent upon which of the first plurality of waveguides the light was transmitted into, according to an embodiment. If light is transmitted into only one of the first plurality of waveguides, then the light will exit from second plurality of waveguides with a linear phase front resulting in a single propagation direction. However, in some examples, if light is transmitted into more than one of the first plurality of waveguides, then the light will exit from second plurality of waveguides with a non-linear phase front (formed from the contributions of different phase profiles), resulting in multiple propagation directions.

Unless specifically stated otherwise, it may be appreciated that terms such as "processing," "computing," "calculating," "determining," or the like refer to the action and/or process of a computer or computing device, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., non-volatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

What is claimed is:

1. An integrated photonic system, comprising:
   a substrate;
   a plurality of optical elements on the substrate, each of the plurality of optical elements comprising
      a coupling region;
      a first plurality of waveguides each coupled to a first side of the coupling region, wherein the first plurality of waveguides each has a substantially same optical path length, and
      a second plurality of waveguides each coupled to a second side of the coupling region,
      wherein the coupling region is configured to couple light received from the first plurality of waveguides into one or more of the second plurality of waveguides based on a relative phase difference of the light across the first plurality of waveguides,
      wherein ends of the first plurality of waveguides across the plurality of optical elements are arranged in a two-dimensional array on the substrate; and
   one or more photodetectors configured to receive the light from the one or more of the second plurality of waveguides, such that the light received from each waveguide of the one or more of the second plurality of waveguides is associated with a different propagation direction of light through free space as it impinges upon the ends of the first plurality of waveguides.

2. The integrated photonic system of claim 1, further comprising a phase modulating element coupled to a corresponding one of the second plurality of waveguides and/or a phase modulating element coupled to a corresponding one of the first plurality of waveguides.

3. The integrated photonic system of claim 1, further comprising a processing device coupled to the one or more photodetectors and configured to determine the propagation direction of light collected by the first plurality of waveguides.

4. The integrated photonic system of claim 1, wherein the one or more photodetectors comprises one or more mixers configured to mix light received from the one or more of the second plurality of waveguides with light received from a local oscillator.

5. The integrated photonic system of claim 1, wherein the plurality of optical elements is a first plurality of optical elements, and the integrated photonic system further comprises a second plurality of optical elements, wherein each optical element of the second plurality of optical elements includes a coupling region, wherein each of the second plurality of waveguides coupled to a second side of a given coupling region of the first plurality of optical elements is coupled to a different coupling region of the second plurality of optical elements.

6. The integrated photonic system of claim 1, wherein the coupling region, first plurality of waveguides, and second plurality of waveguides all comprise silicon nitride.

7. The integrated photonic system of claim 1, wherein the ends of the first plurality of waveguides each comprises an aperture comprising a grating structure, a nano-antenna, or a micromirror configured to couple received light into a corresponding waveguide of the first plurality of waveguides.

8. The integrated photonic system of claim 7, further comprising a cylindrical lens arranged over the substrate and configured to direct light towards the apertures.

9. The integrated photonic system of claim 8, further comprising a lens array arranged between the cylindrical lens and the substrate and configured to focus light received from the cylindrical lens towards the apertures.

10. The integrated photonic system of claim 1, further comprising a coupler having inputs coupled to the second plurality of waveguides and one or more outputs coupled to the one or more photodetectors.

11. An integrated photonic system, comprising:
    a substrate;
    one or more optical sources on the substrate; and
    a plurality of optical elements on the substrate, each of the plurality of optical elements comprising
       a coupling region;
       a first plurality of waveguides each coupled to a first side of the coupling region,
       a second plurality of waveguides each having a first end configured to receive light from at least one of the one or more optical sources and each having a second end coupled to a second side of the coupling region,
       wherein the second plurality of waveguides each has a substantially same optical path length, wherein the coupling region is configured to couple light received from one or more of the second plurality of waveguides into the first plurality of waveguides, such that a relative phase difference of the light across the first plurality of waveguides is based on which of the second plurality of waveguides the light is received from, wherein ends of the first plurality of waveguides across the plurality of optical elements are arranged in a two-dimensional array on the substrate, and wherein light exiting from the ends of each of one or more of the first plurality of waveguides exits at a propagation direction through free space that is based on the relative phase difference of the light between each of the one or more of the first plurality of waveguides.

12. The integrated photonic system of claim 11, further comprising a phase modulating element coupled to any one of the first plurality of waveguides and/or a phase modulating element coupled to any one of the second plurality of waveguides.

13. The integrated photonic system of claim 11, further comprising an amplitude modulating element coupled to any one of the second plurality of waveguides.

14. The integrated photonic system of claim 11, further comprising a multiplexer having an input coupled to the one or more optical sources and a plurality of outputs coupled to the second plurality of waveguides.

15. The integrated photonic system of claim 14, further comprising a logic circuit coupled to the multiplexer and configured to select one or more outputs of the plurality of outputs for the light to travel, wherein the propagation direction of the light exiting from the ends of the first plurality of waveguides is based on the selection.

16. The integrated photonic system of claim 11, wherein the plurality of optical elements is a first plurality of optical elements, and the integrated photonic system further comprises a second plurality of optical elements, wherein each optical element of the second plurality of optical elements includes a coupling region, wherein each of the second plurality of waveguides coupled to a given coupling region of the first plurality of optical elements is coupled to a different coupling region of the second plurality of optical elements.

17. The integrated photonic system of claim 11, wherein the coupling region, the first plurality of waveguides, and the second plurality of waveguides all comprise silicon nitride.

18. The integrated photonic system of claim 11, wherein the second side of the coupling region is opposite to the first side of the coupling region.

19. The integrated photonic system of claim 11, wherein the one or more optical sources comprises one or more diode lasers or one or more light emitting diodes (LEDs).

* * * * *